US011496448B2

(12) United States Patent
Rosas Bustos et al.

(10) Patent No.: US 11,496,448 B2
(45) Date of Patent: Nov. 8, 2022

(54) SYSTEMS AND METHODS OF CREATING AND OPERATING A CLOUDLESS INFRASTRUCTURE OF COMPUTING DEVICES

(71) Applicants: Jose R. Rosas Bustos, Halifax (CA); Joelle Berdugo-Adler, Halifax (CA)

(72) Inventors: Jose R. Rosas Bustos, Halifax (CA); Joelle Berdugo-Adler, Halifax (CA)

(*) Notice: Subject to any disclaimer, the term of this patent is extended or adjusted under 35 U.S.C. 154(b) by 0 days.

(21) Appl. No.: 17/566,209

(22) Filed: Dec. 30, 2021

(65) Prior Publication Data
US 2022/0210138 A1 Jun. 30, 2022

Related U.S. Application Data

(60) Provisional application No. 63/132,285, filed on Dec. 30, 2020.

(51) Int. Cl.
*H04L 9/40* (2022.01)
*H04L 9/08* (2006.01)
(Continued)

(52) U.S. Cl.
CPC ........ *H04L 63/0442* (2013.01); *H04L 9/0861* (2013.01); *G06F 9/5077* (2013.01); *G06F 11/3409* (2013.01); *G06F 2209/501* (2013.01); *G06F 2209/505* (2013.01); *H04L 47/748* (2013.01); *H04L 47/762* (2013.01); *H04L 47/783* (2013.01); *H04L 47/788* (2013.01); *H04L 63/0876* (2013.01); *H04L 63/126* (2013.01); *H04L 67/51* (2022.05)

(58) Field of Classification Search
CPC .......................... H04L 63/0442; H04L 9/0861
See application file for complete search history.

(56) References Cited

U.S. PATENT DOCUMENTS

| 5,790,553 | A | 8/1998 | Deaton, Jr. et al. |
| 7,293,077 | B1 | 11/2007 | Teo et al. |

(Continued)

FOREIGN PATENT DOCUMENTS

WO    WO 2018/055506    3/2018

*Primary Examiner* — Henry Tsang
(74) *Attorney, Agent, or Firm* — Polsinelli PC

(57) ABSTRACT

Aspects involve an apparatus, device, systems, and methods for instantiating and operating a cloudless infrastructure of computing devices that communicate peer-to-peer and mostly off-grid (or otherwise without communicating through a conventional centralized network) to share resources, access, and provide services and applications, store and access data and other information, and the like. The systems may provide services to connecting computing devices, such as user devices, personal computing devices, mobile devices, laptops, personal computers, Internet of Things (IoT) devices etc., in communication with one or more of the nodes of the infrastructure. The infrastructure exchanges or manages communications, transactions, and/or data in a cloudless and/or decentralized environment to freely exchange information between the nodes to allow the infrastructure to scale in response to client demands, adapt the infrastructure to a failed node with minimal impact on connected computing devices, and provide robust security to customer information, communications, and devices.

19 Claims, 13 Drawing Sheets

(51) Int. Cl.
*H04L 47/783* (2022.01)
*H04L 47/78* (2022.01)
*H04L 47/762* (2022.01)
*H04L 47/74* (2022.01)
*H04L 67/51* (2022.01)
*G06F 9/50* (2006.01)
*G06F 11/34* (2006.01)

(56) References Cited

U.S. PATENT DOCUMENTS

| | | |
|---|---|---|
| 7,730,216 B1 | 6/2010 | Issa et al. |
| 9,445,270 B1 * | 9/2016 | Bicket .................... H04W 4/80 |
| 9,679,118 B2 | 6/2017 | Sitrick et al. |
| 10,063,445 B1 | 8/2018 | Preece |
| 10,630,702 B1 | 4/2020 | Irwan et al. |
| 11,086,553 B1 | 8/2021 | Fisher |
| 11,126,364 B2 | 9/2021 | Karr et al. |
| 2007/0124818 A1 | 5/2007 | Bumiller et al. |
| 2008/0155061 A1 | 6/2008 | Afergan et al. |
| 2012/0030343 A1 | 2/2012 | Ryder |
| 2012/0127873 A1 | 5/2012 | Li et al. |
| 2012/0294256 A1 | 11/2012 | Yoshida et al. |
| 2013/0054776 A1 * | 2/2013 | Kunze .................... G06F 9/5061 709/224 |
| 2013/0132601 A1 | 5/2013 | El-Beltagy et al. |
| 2013/0260686 A1 | 10/2013 | Mukherjee |
| 2014/0195671 A1 | 7/2014 | Joyal |
| 2015/0156760 A1 | 6/2015 | Yu et al. |
| 2016/0179581 A1 | 6/2016 | Soundararajan et al. |
| 2016/0246652 A1 | 8/2016 | Herdrich et al. |
| 2017/0085537 A1 * | 3/2017 | Benedek ................ H04L 9/0825 |
| 2017/0206132 A1 | 7/2017 | Song et al. |
| 2017/0373953 A1 | 12/2017 | George et al. |
| 2019/0147164 A1 | 5/2019 | Wing et al. |
| 2019/0163912 A1 | 5/2019 | Kumar et al. |
| 2019/0268310 A1 * | 8/2019 | Guberman .............. H04W 4/70 |
| 2020/0074059 A1 | 3/2020 | Beckett, Jr. |
| 2020/0145493 A1 * | 5/2020 | Wang ................ H04L 9/0894 |
| 2020/0234285 A1 * | 7/2020 | Vanham ............... G06Q 20/065 |
| 2020/0259638 A1 * | 8/2020 | Carmignani .......... H04L 9/0869 |
| 2020/0295929 A1 * | 9/2020 | Kim .................... H04L 9/0897 |
| 2021/0182117 A1 | 6/2021 | Chen et al. |
| 2021/0377210 A1 | 12/2021 | Singh et al. |
| 2021/0410129 A1 | 12/2021 | Freda et al. |

* cited by examiner

SYSTEMS AND METHODS OF CREATING AND OPERATING A CLOUDLESS INFRASTRUCTURE OF COMPUTING DEVICES

CROSS-REFERENCE TO RELATED APPLICATION

This application is related to and claims priority under 35 U.S.C. § 119 from U.S. Provisional Application No. 63/132,285 entitled "Systems and Methods of Creating and Operating A Cloudless Infrastructure of Computing Devices," filed on Dec. 30, 2020, the entire contents of which are fully incorporated by reference herein for all purposes.

TECHNICAL FIELD

Embodiments of the present invention generally relate to systems and methods for generating and operating an infrastructure of computing devices, and more specifically for creating, implementing, and operating a cloudless infrastructure to provide services to requesting devices from the infrastructure of computing devices or nodes.

BACKGROUND

Computing devices connected to or otherwise in communication with a network may receive services from and over the network. The services are many and include communication with and between devices, network computing, cloud services (such as storage services, networking services, and compute services), connection to the public Internet, and the like. To provide such services, cloud providers will often utilize the collective resources of an interconnected group of computing devices. Alternatively or additionally, an Internet Service Provider (ISP) network may provide access to the Internet to a customer device connected to the ISP. The ISP may therefore manage devices and information to provide the Internet access service, which typically involves a database of account information, a domain name system for resolving IP address requests, routers and switches for routing communications from the customer devices, and the like. To reach various services, some network communications will traverse network paths of other providers. In smaller networks, such as local enterprise networks for a business or home, all communications into and out of the network may pass through a single computing device, such as a server, which may also operate as the sole device for network applications and data storage.

Centralized networks offer ease of use and efficiency in maintaining and operating the network. Network devices may be updated regularly through or from a centralized authority, security may be maintained by limiting the accessibility of the network devices to a small number of administrators, and collection and processing of operational data may be simplified through monitoring of a few devices. However, centralized networks have some downsides. For example, centralized networks in which computing devices connect to a central device or device may be vulnerable to a failure at the central device leading to interruption of services for the connected devices. Further, it is sometimes difficult to scale network resources of a small, centralized network to meet customer demand, as scaling generally requires the addition and provisioning of new equipment within the network. Also, use of a centralized network to access the Internet may require customer devices to provide personal information of users, such as passwords, search history, banking information, and the like, during interactions with websites, all of which may be stored in devices within the centralized network. For these and many other reasons, centralized networks of a single controlling device or authority, while ubiquitous, have various drawbacks when providing network services.

It is with these observations in mind, among other, that aspects of the present disclosure were conceived.

SUMMARY

One aspect of the present disclosure relates to a method for securing a network communication. The method may include the operations of identifying, based on a request for an encryption key received from a first computing device of an interconnected network of computing devices, multiple nodes of the interconnected network of computing devices from which random entropic digital data is obtained, the multiple nodes located in geographically diverse environments, obtaining, from the multiple nodes of the interconnected network of computing devices, multiple types of the random entropic digital data, the random entropic digital data acquired by a plurality of sensors each associated with at least one of the multiple nodes of the interconnected network, and translating, by a security service of the interconnected network of computing devices, the entropic digital data into a sequence of prime number values. The method may further include the operations of converting, utilizing a repeatable hashing technique executed by the security service, the sequence of prime number values into an encryption key value, storing at least a portion of the encryption key value at the first computing device of the interconnected network of computing devices, and encrypting, by a second computing device of the interconnected network of devices and using the encryption key value, a communication associated with the second computing device, the first computing device decrypting the encrypted communication utilizing the portion of the encryption key value.

Another aspect of the present disclosure relates to a system for securely operating an interconnected network of computing devices. The system may include a plurality of node devices interconnected in a cloudless infrastructure, each of the plurality of node devices located in geographically diverse environments from the other of the plurality of node devices and each comprising one or more sensors to obtain entropic digital data associated with a corresponding node device of the plurality of node devices, a processor, and a memory comprising instructions that, when executed, cause the processor to perform operations. Such operations may include identifying, based on a request for an encryption key received from a first computing device associated with the cloudless infrastructure, a type of the entropic digital data, obtaining, from the one or more sensors, the type of entropic digital data, and transmitting the type of entropic digital data to the first computing device. The first computing device may receive, from each of the plurality of node devices of the cloudless infrastructure, random entropic digital data, a portion of which corresponds to the type of entropic digital data, convert, utilizing a repeatable hashing technique executed by the first computing device, the random entropic digital data into an encryption key value, and encrypt a communication using the encryption key value.

Yet another aspect of the present disclosure relates to a method for securing a network communication. The method may include the operations of obtaining, from multiple nodes of an interconnected network of computing devices, random entropic digital data acquired by a plurality of sensors each associated with at least one of the multiple nodes of the interconnected network and acquiring a type of the random entropic digital data, translating, by a security service of the interconnected network of computing devices, the entropic digital data into a sequence of prime number values, and converting, utilizing a repeatable hashing technique executed by the security service, the sequence of prime number values into an encryption key value. The method may further include the operations of storing at least a portion of the encryption key value at a first computing device of the interconnected network of computing devices and encrypting, by a second computing device of the interconnected network of devices and using the encryption key value, a communication associated with the second computing device, the first computing device decrypting the encrypted communication utilizing the portion of the encryption key value.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Figure 1:
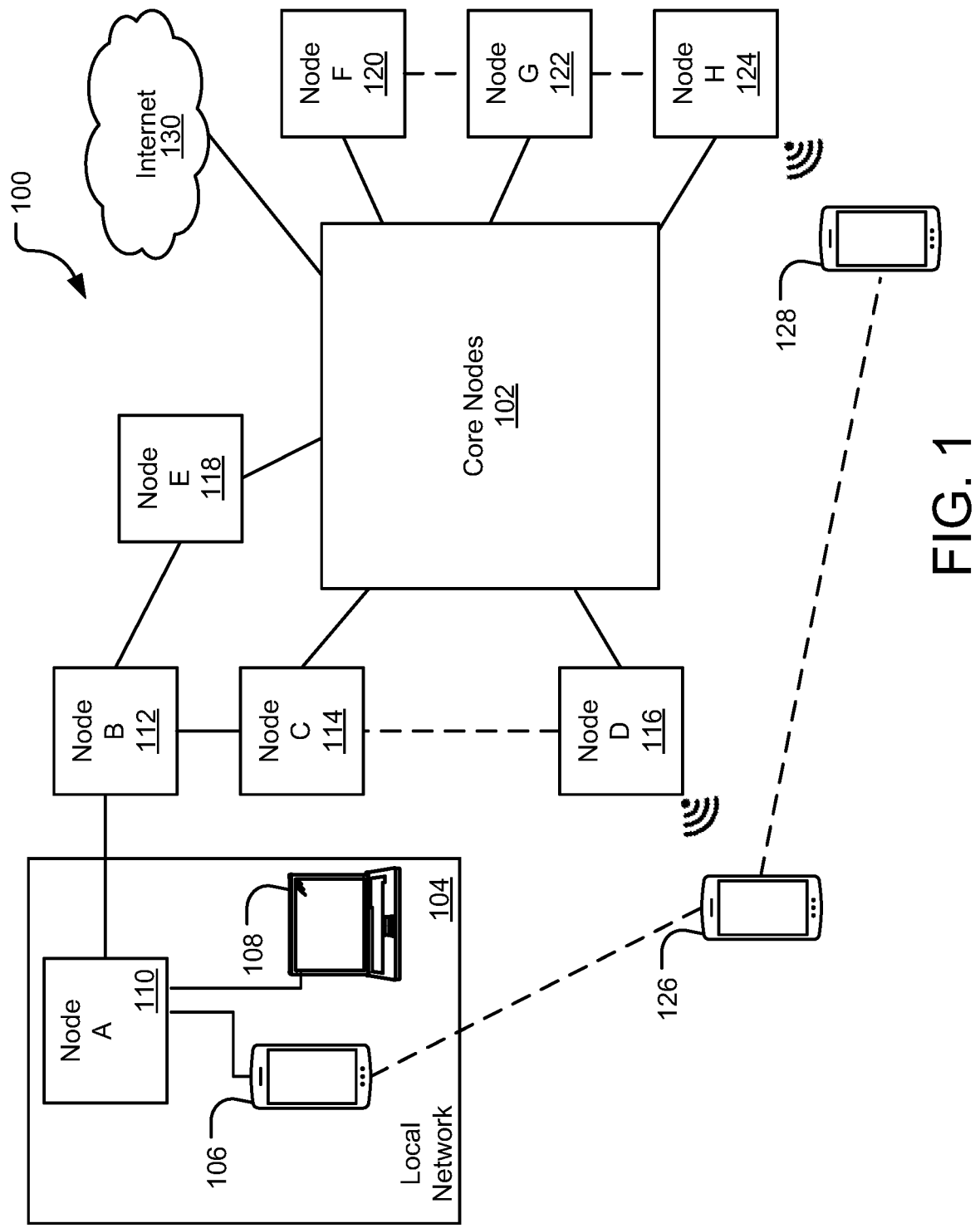
FIG. 1 is a schematic diagram illustrating an exemplary infrastructure of computing devices in accordance with one embodiment.

Aspects of the present disclosure involve an apparatus, device, systems, methods, and the like, for instantiating and operating an infrastructure of computing devices, also referred to as nodes of the infrastructure. In one implementation, a cloudless infrastructure may comprise a collection of computing devices that communicate peer-to-peer and mostly off-grid (or otherwise without communicating through a conventional centralized network) to share resources, access, and provide services and applications, store and access data and other information, and the like. The systems described herein may provide services to connecting computing devices, such as user devices, personal computing devices, mobile devices, laptops, personal computers, Internet of Things (IoT) devices etc., in communication with one or more of the nodes of the infrastructure. Through the computing devices and the various techniques discussed herein, the system generates an infrastructure to exchange or manage communications, transactions, and/or data in a cloudless and/or decentralized manner or otherwise to freely exchange information between the nodes to allow the infrastructure to scale in response to client demands, adapt the infrastructure to a failed node with minimal impact on connected computing devices, and provide robust security to customer information, communications, and devices.

In general, the cloudless infrastructure presented herein approaches a "one node to one user" ratio, cloudless infrastructure to provide network communications and network transactions in a secure, resilient, and scalable manner. As such, the cloudless infrastructure may also be referred to herein as a "cloudless network" of computing devices without deviating from the scope of the cloudless infrastructure nature of the collection of devices. Communications between the devices, or "nodes", of the cloudless infrastructure mainly occur over a peer-to-peer connection, forming a mesh network of such nodes. In some instances, when an appropriate peer-to-peer connection is not available, communications may traverse a conventional network, although up to 80% of communications between the computing devices of the infrastructure may occur "off-grid." In one implementation, the infrastructure may be organized in interconnected clusters using a fractal approach. Neighboring devices of the infrastructure may be connected in a peer-to-peer fashion, creating a mesh network for processing and storing information (which may be present in a single node or in a plurality of nodes), providing a platform for one or more applications (including third-party applications) access to data stored on the nodes, and facilitating interactions among entities, computing devices, applications, etc. Further adding to the scalability of the infrastructure is the ability of nodes to process decisions based on context, the deployment of services in target clusters or in the entire infrastructure, and/or the ability of clusters to share resources and services. The infrastructure provides, among several other advantages, a distributed computing environment, decentralized virtual networks, decentralized virtual machines, edge computing platforms, decentralized Domain Name Services (DNS), and/or a mesh network infrastructure in a cloudless and decentralized collection of computing devices. Services deployed on and executed by the cloudless infrastructure allow connecting devices to share and consume compute resources, network resources, storage resources, IoT metrics, security services, and the like.

In one implementation, the nodes of the infrastructure may be fractally interconnected to reduce the number of interconnects between the nodes of the network while providing connections of the nodes so as to not isolate any nodes and grow the infrastructure, and to provide for massive scalability of the cloudless network. This fractal approach provides the infrastructure with a natural and repetitive growth mechanism without the need for a centralized network planning entity determining how and where to scale the network resources, decentralizing the infrastructure from a conventional centrally-managed controlling entity and associated systems. Management of the resources and services available from the infrastructure also benefit from the fractal structure as each node of the network is not burdened with maintaining and processing communications with each other node of the network. Rather, nodes of the infrastructure may be limited to a particular subset of the nodes of the infrastructure to which services and resources may be shared. In one implementation, nodes of the infrastructure may be assigned a network layer identifier associated with a layer of the infrastructure. One or more of the nodes may then be limited in the logical connections it makes with other nodes of the infrastructure based on that network layer identifier. In one implementation, a node may logically connect to one layer above or one layer below the assigned or associated layer for the node. This fractal structure may reduce the number of interconnects each node may need to maintain with other nodes of the network. Further, the structure enforces sharing of services and/or resources of the infrastructure throughout the layers of the infrastructure such that groups of nodes do not become isolated in sharing resources from the rest of the infrastructure. As the infrastructure grows through the addition of new nodes into the infrastructure, this fractal pattern may be maintained by adding layers to the infrastructure when previous layers become full or otherwise. This structure therefore provides for scalability of the infrastructure, while limiting the burden on each node of the infrastructure to communicate with each other node.

In one implementation of the infrastructure, the node devices of the infrastructure may collectively operate a network of interconnected and communicating devices. Further, as the communications between the devices of the infrastructure may occur in a direct, peer-to-peer manner, the infrastructure may be referred to as a cloudless network of devices. As such, the infrastructure may be referred to herein as a "cloudless network". However, it should be appreciated that the infrastructure of devices may, in some instances, include supplemental cloud-based communications and/or services, particularly when the cloudless network is not fully deployed, and may provide additional services other than network services, despite being referred to herein as a cloudless network. Other advantages of the infrastructure of devices are discussed with detail below.

In one implementation, the infrastructure may comprise computing devices constructed and/or configured to communicate with other node devices of the infrastructure, the collection of which may form a cloudless network. The node devices may also be configured as gateway devices to communicate with one or more connecting computing devices, such as enterprise computers, network devices, storage devices, mobile phones, laptops, tablets, media players, etc., to provide access to the collection of nodes of the network for the computing devices. As used herein, such connecting computing devices may be referred to as "personal computing devices", although any type of computing device, networking device, and storage device, including public or private computing devices, may be considered personal computing devices for connecting to the infrastructure to receive or otherwise consume services from the network of devices and for accessing the nodes of the infrastructure. The node devices of the infrastructure may execute one or more software programs to provide services to the personal computing devices, such as compute services, networking services, storage services, multimedia services, and the like, and may otherwise operate as "nodes" of the infrastructure. In general, a node device of the infrastructure may include any computing device connected to or otherwise in communication with another computing device of the cloudless infrastructure. As such, the term "node" used herein may refer to gateway devices, personal computing devices or other connected devices, or any other type of computing device not listed herein but connected to or integrated within the infrastructure. A personal computing device may thus be a node and vice versa. Further, the infrastructure of the nodes may be referred to herein as the decentralized network, the cloudless network, the cloudless, decentralized network, or the network, and such terminology may be considered interchangeable. The nodes of the infrastructure may communicate to share resources to provide such services, such as sharing storage capacity between multiple nodes associated with a provided service. One or more applications may be executed on the nodes of the infrastructure, including the connected computing devices, that utilize aspects of the available services. In this manner, a cloudless infrastructure may be established to provide services to connecting devices.

A node device may register with one or more other nodes of the cloudless infrastructure to create the cloudless network described. For example, a particular node device may transmit unique identifying information to another node of the cloudless network as part of a registration process. The node device may initiate the registration process, automatically, when first powering up, through a user interface or otherwise. In some instances, the unique identifying information, also known as device fingerprint information, may include unique identifying indicia of the registering node device based on its hardware and/or software. A registration service deployed on the cloudless network may receive the device fingerprint information and generate a unique node device identifier from the device fingerprint information. In some instances, the network may store or otherwise have access to a stored list of validated node identifiers to which the generated identifier may be compared and, upon validation, the node device may be registered as a node of the network. An access level may be associated with the node identifier and, upon registration, one or more nodes of the cloudless network may provision the verified node device with the authorized content, programs, or services as indicated by the access level associated with the node identifier. In this manner, node devices may register with and become nodes of the cloudless network to scale the network resources and accommodate additional network users.

Some registered node devices may provide an interface to the cloudless network for various computing devices such that applications executed on the computing devices may receive network services and/or utilize resources available from the cloudless network. Thus, some nodes of the cloudless network may have gateway capabilities to provide connection to the network for other computing devices. Other nodes of the network, referred to herein as "core nodes" may not provide the gateway services or features. However, core nodes may operate in a similar manner as other nodes by hosting services, executing applications, sharing resources with other nodes, and the like. Computing devices may, upon connecting to a node device, be associated with a computing device identifier in a similar manner as above. For example, an application executed on the computing device may obtain and transmit device fingerprint information to one or more nodes of the network. In one implementation, the fingerprint information may include hardware-based information and/or software-based information of the computing device. A service executed on the nodes of the cloudless network may generate a unique computing device identifier from the device fingerprint information and register the computing device with the network based on the unique computing device identifier. Further, the new device may interact with the nodes, services, and applications of the network using its unique computing device identifier without the need to store or transmit information of the user, if the computing device is a personal computing device for example, or other information. For example, applications and/or services may be configured to use the unique computing device identifier of the personal computing device as a signature or other identifier in place of a user identifier. Because the device identifier is generated from device-specific information of the personal computing device, it is implicitly tied to a user but personal information of users of the network may not be obtained and stored such that personal information of the user is not shared or put at risk while interacting with the network. In this manner, the identifier used within the cloudless network may be more secure than other types of user identifiers that typically include some personal information of the user that provides for protection of user personal information in an off-grid network like the one described herein.

The cloudless network may also provide additional unique security features. For example, one or more nodes of the network and/or one or more personal computing devices in communication with the network may generate an encryption key pair for use in encrypting data or information associated with the network. In one instance, the encryption key pair may be generated based on entropic or random information or data obtained from nodes of the network. For example, one or more nodes of the cloudless network may include sensors configured to obtain a measurement of an aspect of the environment around the node. Such measurements may include, but are not limited to, a temperature, humidity, atmospheric pressure, light, and/or sound measurements from the environment around the node device. In another example, one or more bio-measurements associated with a user of a personal device, such as but not limited to, a pulse, an estimated calories burned, a number of steps taken in a time period, etc., may be obtained and transmitted to the node. In general, any type of data or measurements may be obtained or generated by the nodes of network and combined to generate a truly random or entropic set of data. The node or nodes of the network may utilize the obtained entropic digital data to generate one or more encryption keys for use in encrypting information and/or data associated with the network, including personal transactions conducted on the cloudless network. Because the inputs to generate the encryption keys are randomized as obtained from a random collection of environmental data, physical measurements, bio-information, and other types of randomized data collections from a variety of locations/devices, the generation of encryption keys is far more secure when compared to conventional encryption systems. Further, the encryption keys for the network may be re-generated at an accelerated rate over traditional encryption key rotation cycles as the data from which the keys are generated is randomized and entropic, increasing the secure nature of the encryption service provided by the network. Further still, as additional nodes are registered or added to the network, additional sources of entropic data may be included in the entropic data collection to provide exponential entropic data to the encryption key generation system. Conventional entropic data generation systems typically use one source of data such that the network discussed herein provides an exponentially stronger entropic nature of the collected data for generation of the encryption keys for the network.

Infrastructure of the Cloudless Network

FIG. 1 illustrates an exemplary operating environment 100 in accordance with one embodiment. In general, the environment 100 provides for a cloudless, decentralized collection of computing devices in communication with each other in a peer-to-peer manner, often without connection to a communications network such as the Internet. A cloudless network of such devices provides for sharing of resources, both hardware and software, to operate or otherwise facilitate the network among some or all of the components of the network that are each capable of running or operating independently of each other. A typical centralized network may be controlled, operated, or managed by a centralized entity such that a majority of the functions and services needed to facilitate the network are operated by that entity. A decentralized network, on the other hand, may spread the services and other software for operating the network among the devices of the network outside of a single or limited centralized group of controlling entities. Such centrally managed and controlled networks typically require a connecting device to connect to a centralized database to register with the network to receive services. In contrast, a device connecting to the cloudless network described herein may communicate with one or more other devices of the network to register the device and receive the network services, while also becoming a new node to the network.

A portion of a cloudless network 100 is illustrated in FIG. 1. In particular, several computing devices are shown as interconnected in various manners. Although only a few such computing devices are illustrated as part of the cloudless network 100, it should be appreciated that any number of such devices may be included in the network environment 100. Additional devices may also form the cloudless network environment 100 of FIG. 1. For example, the network of devices 102 may include and/or connect with one or more node devices 110-124. In general, a node device 110-124 may be any type of computing device that communicates (often in a peer-to-peer relationship) with other computing devices of the network 100 to share resources, access, and provide services and applications, store and access data and other information and/or otherwise to provide services to connecting computing devices. Some node devices 110-124 are computing devices that may provide a gateway or interface into the cloudless network environment for personal devices, such as mobile computing devices 126, 128, that are in communication with the node device As explained in more detail below, each node device 110-124 with a gateway functionality may include software, programs, applications, services, etc. that are executed by the respective node device to facilitate interactions with other computing devices of the cloudless network. In this manner, the collection of node devices, among other computing devices, provide the communication, processing and/or storage infrastructure for the cloudless network 100.

The nodes of the network environment 100 may communicate via any type of physical, wireless, or virtual connections between corresponding devices, often in a peer-to-peer configuration. In the example of FIG. 1, wired or wireless connections between devices are illustrated as a solid line and virtual connections are illustrated with dashed line, although any type of communication medium may be used by the nodes to communicate with each other. Other wireless-type connections, such as WiFi connections, are also illustrated in the environment 100, such as between mobile device 126 and node D 116. In one example but non-limiting configuration, node device A 110 may be located within a local network 104 at a residence or place of business and may be connected to cloudless network via node B 112. In this example, the connection between the node device A 110 and node device B 112 may include a physical or wireless connection, which may also be a portion of a distinct telecommunications network. Thus, node B 112 may connect to the same telecommunications network to which node A 110 is also connected such that communications may be shared between the devices across the telecommunications network. However, the majority of the communications between the nodes 110-124 of the cloudless network occur by way of the direct communication paths between the nodes, with little to no communications transmitted via a telecommunications network or the Internet. In general, node A 110 may communicate with node B 112 via any type of connection (wired or wireless, direct peer-to-peer, via a network, etc.) that provides for the exchange of communication packets between devices. The process of registering node A 110 (or other nodes) to become a device of the cloudless network is discussed in more detail below with reference to FIG. 3.

Customer home or business LAN 104 may include a gateway device 110 to communicate with other devices of the cloudless network and/or personal communication devices such as, but not limited to, a personal computer 108 or mobile computing device 106 in communication with the gateway 110, either through a wired connection or a wireless connection, such as WiFi, Bluetooth, cellular communications, and the like. Here, the node includes gateway functionality and hence it is considered a gateway, among other things. The personal computing devices 106, 108 and the gateway device 110 enable a device at the local network 104 to communicate to the cloudless network of devices, e.g., the various nodes B, C, D etc. and the core nodes 102 to receive services from the other nodes of the network 100, such as access to the Internet 130, to exchange communications, to stream multimedia content, to access application and storage, and the like. Device 106 may be wireless telephone, smart phone, tablet, or portable laptop computer, among other things. Further, in instances where the device 106 is a portable or mobile device, it may reconnect to the cloudless network via another node with a gateway capability when brought within broadcast range or otherwise connected to the other node device. For example, device 106 may be brought within broadcast range of node H 124 at a location separate from the local network 104. Through an exchange of information between the device 106 and the node H 124 (as explained in more detail below), the device may connect to the cloudless network via node H and receive the services available from the network as before. In some instances, one device 106 of the local network 104 may request a service from the cloudless network of devices to be available from node A 110. Once the service is located at node A 110, other devices of the local network, such as computer 104, may also consume the service as available from node A.

In a similar manner as above, node device B 112 may also be connected to or in communication with node E 118 and/or node C 114. Moreover, through a connection with another device, such as the connection of node B 112 to node E 118 or the connection of Node B to node C 114, node B may gain access to the broader network for communication among the devices, among other things. In other instances, node B 112 and node E 118 may be within a wireless communication range such that communications between the devices may be shared directly over the wireless medium. Node C 114 may also communicate with node B 112 over the same or a different communications mechanism. Further, each of node E 118 and node C 114 may connect to still other devices or nodes of the network, including at the network of core devices 102, which may further facilitate communication with other devices. In this manner, components, or "nodes", of the cloudless network 100 may be interconnected to perform one or more of the procedures described herein, exchange applications and/or services, or otherwise operate as a network of communication devices.

In addition to actual connections, either through a wired medium or a wireless medium, the devices of the cloudless network 100 may establish one or more virtual connections between the network nodes, components, or devices. For example, node C 114 of network environment 100 may not be connected to the same communications network as node D 116 such that a direct exchange of communications between the devices may not occur. However, through the network of devices 100 or other components of the cloudless network 100, a virtual connection between node C 114 and node D 116 may be established to exchange communications, data, programs, etc. In a similar manner, device 106 may not be within a wireless range of mobile device 126 to establish direct communication. However, via the components of the cloudless network 100, the devices 106, 126 may form a virtual connection such that communications and/or data may be shared between the devices 106, 126. This exchange of communications may occur without the devices 106, 126 connecting to a common or centralized device such that the virtual connections may traverse at least a portion of the cloudless network but not necessarily connecting to a centralized network of devices. In a similar manner, other nodes of the cloudless network 100 may establish direct connections or virtual connections. The interconnection of the nodes of the cloudless network 100 is discussed in more detail below and may be such as to reduce the complexity and interconnectedness of the nodes of the network.

Figure 2:
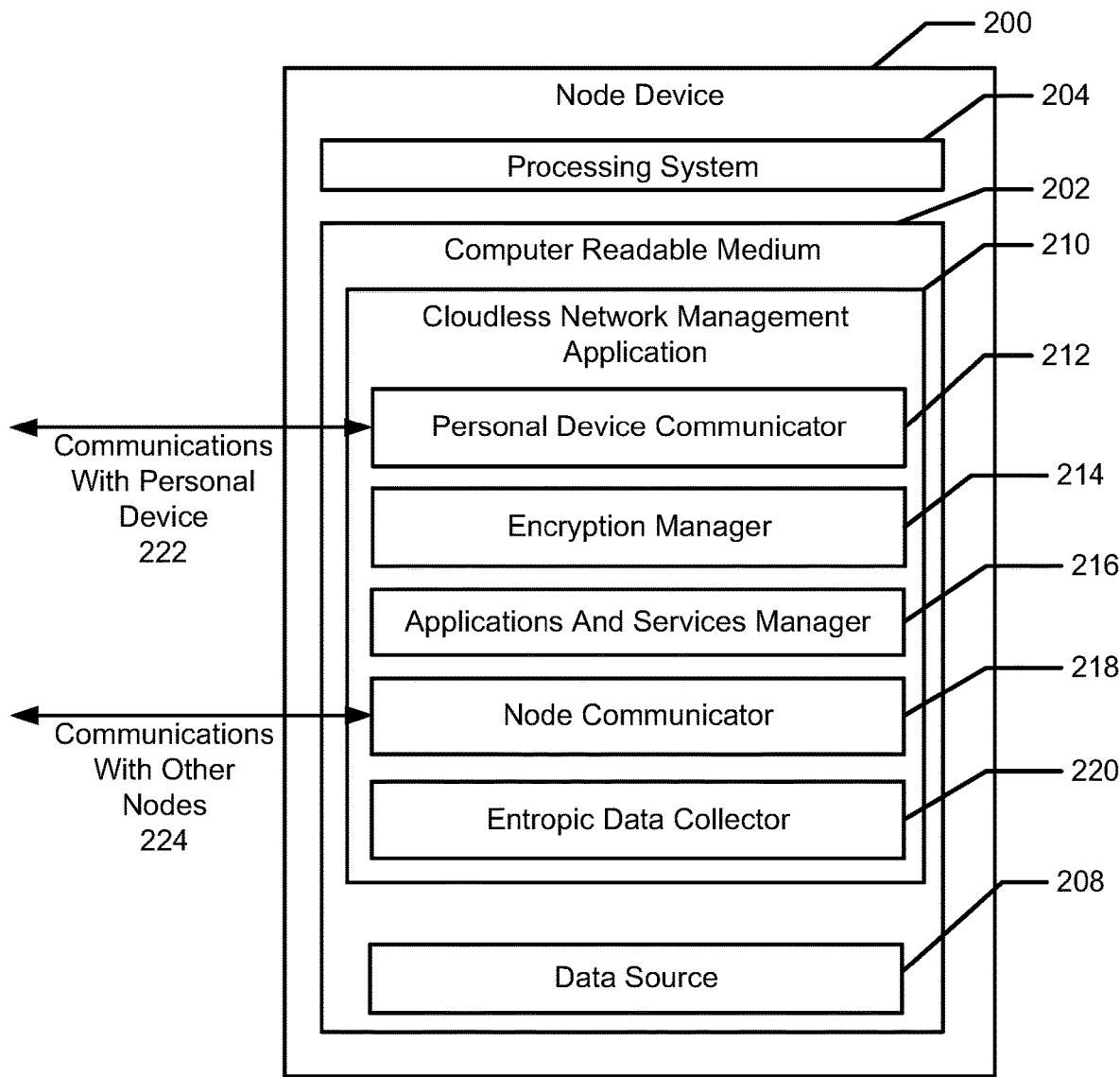
FIG. 2 is a schematic diagram illustrating a node device for connecting to a cloudless infrastructure of computing devices in accordance with one embodiment.

As shown, the network environment 100 may include at least one node device 110-124 through which personal devices 106, 108 may connect to a cloudless network. In general, the node device 110 may be any networking or computing device or multiple networking or computing devices configured to execute a registration process with another node of the cloudless network, as explained in more detail below. One particular example of the node device is illustrated in FIG. 2. FIG. 2 is a schematic diagram illustrating an example node device 200 through which a personal device or other computing device may connect to a cloudless network in accordance with one embodiment. For example, the node device 200 of FIG. 2 may be the node device 110 of the local network 104 discussed above, or any other of the node devices discussed in relation to the network environment 100 of FIG. 1.

In some instances, the node 200 may execute a cloudless network management application 210 to manage the registration of the mode device with the network to become a node of the network and/or perform network operational procedures to facilitate the cloudless network. To operate as a node of the cloudless network, the node device 200 may execute the network management application 210 to perform one or more of the operational procedures described herein. In particular, the network management application 210 may be stored in a computer readable media 202 (e.g., computer memory) and executed on a processing system 204 of the node 200 or other type of computing system, such as that described below. The computer readable medium 202 includes volatile media, nonvolatile media, removable media, non-removable media, and/or another form of tangible available storage medium. By way of example and not limitation, non-transitory computer readable medium 202 comprises computer storage media, such as non-transient storage memory, volatile media, nonvolatile media, removable media, and/or non-removable media implemented in a method or technology for storage of information, such as computer readable instructions, data structures, program modules, or other data.

The network management application 210 may also utilize a data source 208 of the computer readable media 202 for storage of data and information associated with the node device 200. For example, the network management application 210 may store information associated with registering and operating the node device 200 as a node of the cloudless network (e.g., network 100), including generated and/or received encryption keys, identifiable fingerprint information of the node device 200, applications and/or services available from the node, data and information of the cloudless network infrastructure, and the like. In general, any data or information utilized by the network management application 210 may be stored and/or retrieved via the data source 208 such that the node device 200 may operate as a node of the network 100, providing access, programs, services, etc. to connecting devices.

The network management application 210 may include several components to perform one or more of the operations described herein. For example, the network management application 210 may include a personal device communicator 212 to exchange communications 222 with a personal device, such as a smart phone, cell phone, laptop computer, tablet device, etc. For example and returning to FIG. 1, node A 110 may, using the personal device communicator 212, communicate with device 106 and exchange information, communication packets, data, etc. 222 between the devices. In some instances, the personal device communicator 212 may utilize a wireless protocol to communicate with the personal device, such as WiFi, Bluetooth, Near Field Communications (NFC), and the like. In one particular instance, the personal device communicator 212 may generate a WiFi hotspot for communicating wirelessly with a personal computing device. The personal device communicator 212 may utilize other communication protocols to communicate with personal computing devices, included wired or wireless protocols.

The network management application 210 may also include an encryption manager 214 for generating, communicating, and otherwise managing identification data and information of the node device 200 for registering and operating the node of the network, including but not limited to encryption keys, registration information, device fingerprint information, and the like. As explained in more detail below, the encryption manager 214 may communicate with other nodes of the cloudless network to register the node device 200 with the network. In some implementations, the encryption manager 214 may transmit node device identification information (such as hardware and/or software fingerprints associated with the node device 200) and/or entropic data or information or measurements utilized by the network for generating encryption keys or other information for the node device, receive encryption keys associated with the node device 200 from one or more nodes of the cloudless network, store and manage encryption keys for the node device 200, and/or communicate with one or more personal devices to ensure secure communication and sharing of information or data between the personal devices and the cloudless network. Several of such operations executed by the encryption manager 214 are included in the methods described herein.

The cloudless network management application 210 may also include an applications and services manager 216 to manage applications and servers supported by the node device 200. In general, services are programs utilized by the network management application 210 to operate the node device 200 as a node of the cloudless network in conjunction with other nodes of the network. For example, a network service may provide shared computing, networking, storage, and other computing resources among one or more of the nodes of the network. The management of such shared resources may be controlled or otherwise managed by the applications and services manager 216 of the network management application 210 via communication between the node device 200 and other nodes of the network to coordinate the sharing of the network resources. Applications may utilize such shared resources to provide solutions for devices of the network, including personal devices in communication with the node device 200. For example and with reference to FIG. 1, personal device 106 may execute an application that utilizes services provided by cloudless network 100 via node A 110. An applications and services manager 216 may determine the network resources needed to execute the application, including networking, storage, computing power, etc. being requested of the network by the application. The applications and services manager 216 of the node device 110 may, in response, execute one or more service programs to request shared resources with other nodes, communicate with other nodes, determine availability of resources of the other nodes, and the like. In this manner, the applications and services of the cloudless network may work in tandem to request and manage resources available from the nodes of the network and consume those shared resources. Many of the operations of the services and applications may thus be managed by the applications and services manager 216 of the network management application 210 of the node device 200. Additional operations of the services and applications associated with the cloudless network are discussed in greater detail below.

A node communicator 218 may also be included with the cloudless network management application 210 to communicate 224 with other nodes of the network 100. As mentioned above, nodes of the network may share resources for applications executed on the nodes or personal devices in communication with the network. Communications 224 between the nodes sharing resources may be exchanged to coordinate and/or manage the sharing of the resources between the nodes. For example, an application executed on personal device 106 of local network 104 may request an amount of storage to operate. In some circumstances, node A 110 may not have enough storage availability to satisfy the request from the application and may request additional storage space from node B 112 or any other node of the network 100. One or more services executed by node A 110 may communicate, utilizing the node communicator 218, with one or more other nodes of the network 100 to request and obtain the storage capacity for or needed by the application. In general, any communications 224 for managing the registration, operation, and/or configuration of the nodes of the cloudless network 100 may be transmitted and/or received via the node communicator 218.

Communications 224 between the nodes of the network may occur via any known or hereafter communication medium. For example, the node devices may be communicate through a peer-to-peer connection over a wireless connection, such as over WiFi, Bluetooth, cellular communications, and the like. In this manner, the node devices may communicate directly (one-to-one connection) in a cloudless, decentralized infrastructure to provide the services and transactions between the node devices and/or the computing devices connected to the cloudless network via a node device 200.

In addition, the cloudless network management application 210 may include one or more entropic data collectors 220 to obtain, in one instance, a measurement of some aspect of the environment or other physical characteristic associated with the node device 200 and/or a device in communication with the node device. In another instance, the entropic data collectors 220 may receive other randomized digital data from one or more sources associated with the node device 200. In one particular example, the entropic data collectors 220 may include sensors or other mechanisms (e.g., connection to a remote sensor) to obtain a temperature, humidity, atmospheric pressure, light, and/or sound measurements from the environment around the node device. In another example, one or more bio-measurements associated with a user of a personal device, such as personal device 106 of FIG. 1, may be obtained and transmitted to the entropic data collectors 220 of the node device 200. In general, any sensor 220 or other type of data collector may be included or associated with the node device 200 for obtaining entropic digital data or information. As explained in more detail below, such random data may be used to generate encryption keys or other secure information or data for secure operation and communication of the cloudless network 100.

It should be appreciated that the components described herein are provided only as examples, and that the cloudless network management application 210 may have different components, additional components, or fewer components than those described herein. For example, one or more components as described in FIG. 2 may be combined into a single component. As another example, certain components described herein may be encoded on, and executed on other computing systems.

As described above, the node device 200 may operate as a node of the cloudless network 100 such that other devices of the network may communicate with the node device to receive services from the network or otherwise interact with the cloudless network. In some instances, the node device 200 may be a computing device on which the cloudless network management application 210 may be executed. In another instance, the node device 200 may be manufactured particularly to operate as a node of the cloudless network 100, otherwise known as a core node of the network. Regardless of the structure of the node device 200, identification and registration of the device with other devices of the network 100 may occur such that the device 200 may securely operate as a node of the cloudless network 100.

Device Registration for the Cloudless Network

Figure 3:
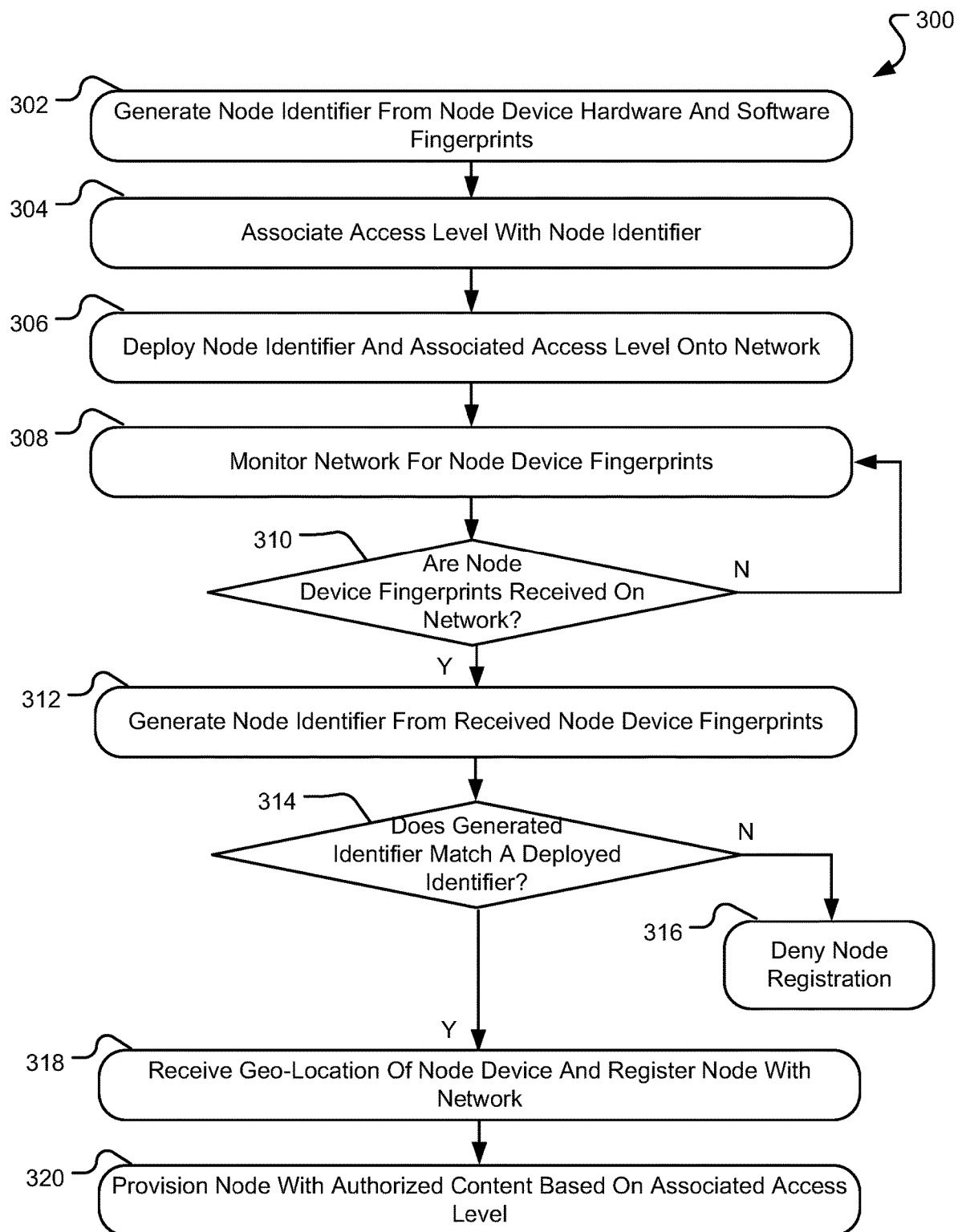
FIG. 3 is a flowchart illustrating one method for registering and provisioning a node device with a cloudless infrastructure in accordance with one embodiment.

Various possible implementations of a cloudless network may involve a unique form of device registration that provides, among other things, a mechanism for decentralized network expansion. FIG. 3 is a flowchart illustrating one method 300 for registering and provisioning a node device with a cloudless network in accordance with one embodiment. In one instance, the operations of the method 300 of FIG. 3 may be executed or performed by the cloudless network management application 210 of the node device 200 of FIG. 2. As mentioned above, a registered node device 200 may operate as a node of the network and may be tasked with executing some network management procedures involved with operation of the cloudless network. Thus, each node of the network may execute one or more services to register other node devices or personal devices with the network such that those registered devices may also be a node of the network thereby providing a decentralized mechanism by which the network may expand and provide services to still other devices. The cloudless network management application 210 may execute the operations described in relation to the method 300 to register a neighboring node device as a node of the network. In some instances, providing the registration service to a requesting node device may include resources or services from other nodes of the network, including obtaining of registration information, storing of registration information, software or other programs executed to perform the operations of the method, and/or generation of secure identifiers used to register devices as nodes of the network. In still other instances, one or more of the operations may be performed by other components of the cloudless network 100, such as personal devices 106, 108 and/or other nodes of the network. The operations of the method 300 may therefore be performed by multiple cloudless network management applications 210 operating on multiple nodes or devices of the cloudless network and working in tandem to register a newly connected device or node to the network. In this manner, the registration service available from the network may be further decentralized and cloudless such that no one device or entity controls the registration process. In general, the operations may be executed through hardware components, software programs executed in a processing environment of the nodes or otherwise, or a combination thereof.

Beginning in operation 302, one or more node identifiers may be generated from specifications of the node hardware and/or software fingerprints. For example, a node device 200 may include particular hardware components (e.g., microprocessor chips, storage devices, input/output devices, etc.) One or more of these hardware components may be associated with identifying information, such as serial number identifiers, manufacturer identifiers, version identifiers, model identifiers, and the like. The identifying information of the hardware components of the node 200, alone or in various possible combinations, may be determined and used to generate a hardware fingerprint that identifies or is otherwise associated with the particular node 200 based on the hardware components of the node device. For example, the identifying information of the hardware components of the node 200 may be used as inputs to an algorithm configured to generate a hardware fingerprint identifier for the node device. In one instance, the hardware component identifiers used to generate the hardware fingerprint may be received from a manufacturer of the node device 200. In another example, the hardware component identifiers of the device 200 may be accessible from the device upon a request from the device itself or from another device, such as another node of the network.

In one implementation, the hardware fingerprint may be determined upon manufacturing of the node device 200 and stored within a memory component of the device. For example, the various identifiers of the hardware components of the node device 200 (e.g., serial number identifiers, manufacturer identifiers, version identifiers, model identifiers, etc.) may be determined and input into the hardware fingerprint generating algorithm at the manufacturing site of the device. During an initial testing of the node device at the manufacturing site or testing site, the generated hardware fingerprint may be stored at a particular address in non-volatile memory of the device. Thus, to obtain the hardware fingerprint, the node device 200 may access the memory of the device at the address to obtain the hardware fingerprint. In other implementations, the various hardware identifiers used to generate the hardware fingerprint may be stored in the memory device or other component of the node device. The node device, in such circumstances, may obtain the identifiers and execute the fingerprint-generating algorithm, using the identifiers as input to the algorithm, to generate the hardware fingerprint.

Similarly, a software fingerprint (or fingerprints) associated with software programs loaded onto the node 200 and stored may be obtained and used to generate the node identifiers. For example, upon manufacture, one or more operational programs, such as services, applications, operating systems, firmware, etc. may be loaded and stored in a memory component of the device 200. One or more of the loaded software programs may include an identifier, such as a version identifier, a program name, a model identifier, etc. Such identifiers, alone or in various possible combinations, may be obtained and combined into a software fingerprint, as described above with relation to the hardware fingerprint. In some instances, portions of the hardware identifiers and the software identifiers may be combined to generate a device fingerprint. In general, any identifiers of the hardware components and/or the software programs associated with the node device 200 may be used as hardware or software fingerprints. In addition, the software fingerprint may be updated as new versions or updated versions of software are loaded onto the node device 200 through the same or similar method described above. Further, as described in more detail below, this updated software fingerprint may be distributed to other nodes of the network 100 upon updating using the new software identifiers.

From the hardware and/or software fingerprints of the node device 200, a unique node identifier may be generated in operation 302. The node identifier may be generated from an algorithm, such as a hashing function or any other identifier generating algorithm, that uses the hardware fingerprint and/or the software fingerprint of the device as inputs and outputs a unique identifier. In one implementation, the algorithm used may be a reproducible hashing function such that, given the same hardware and/or software fingerprint inputs, the node identifier may be reproduced using the hashing function by any computing device executing the algorithm, including other nodes of the network 100.

In operation 304 of the method 300, an access level for the node device 200 may be associated with the generated node identifier of the device. In particular, some node devices of the network may be manufactured or otherwise configured to operate at a particular level of access within the cloudless network. For example, a first type of node device may be configured, based on both the hardware components of the device and/or the software uploaded and stored on the device, to interact within the network at a high-level, such as the ability to generate services, host multiple services for other devices, operate as a registration device, and the like. Other node devices may be configured with a lower-level of access, perhaps providing an interface to the network for personal devices while limiting the number and kinds of services available from that particular device. In some instances, the node devices are manufactured and loaded with appropriate software to provide the various levels of access, and the information for these manufactured devices stored and used, as discussed below. In general, the cloudless network 100 may include any number and variations of access rights or levels for the devices of the network to structure or configure the operations of the network. Each generated node identifier may therefore be associated with an access level of the network such that the access level for a node may be determined from the node identifier. Further, in some instances, the access level associated with a node identifier may be adjusted or altered to provide more or less access rights to the network for the adjusted node device. Such adjustments to the access level of a node device may be based on the device itself, a service agreement, an adjustment to the technological capabilities of the node device whether through software or hardware additions or other changes, and the like. In some implementations, the adjustment to the access level for a node device may occur upon a software update or other alteration to the operation of the node device.

The node identifier and the associated access level for the node device may be deployed onto the network 100 in operation 306. As mentioned above, the network 100 is structured in a decentralized manner such that there may not be a central database storing the node identifiers for the nodes of the network. Rather, the node identifiers (and associated access levels) may be stored on any node or any number of nodes of the network as determined by a registration service program operating on the various nodes of the network. For example and referencing the network environment 100 of FIG. 1, a node identifier for node A 110 may be stored on node E 118 as determined by a registration service executed by node E. Further, the node identifier for node A may be stored across multiple nodes of the network. For example, a node identifier for node A 110 may be stored on node D 116, while an access level associated with node A may be stored on node G 122. In another example, a portion of the node identifier for node A 110 may be stored on a first node of the network while a second portion of the node identifier may be stored on a second node. In general, the node or nodes at which the node information is stored may be based on a storage availability within the nodes of the network 100 and may be transferred from node to node to free up storage space, as needed. For example, node B 112 may transfer some or all of the node identifier for node A 110 to node C 114 to free up space on node B for providing a service from node B or any other storage reason. An identifier of the node at which the node information is stored may also be distributed across and stored in the nodes of the network 100 and may be updated by the registration service of the network as the information distributed in the network. In one particular implementation, the node identifiers and the associated access levels for the node devices may be stored on a given node or combination of nodes utilizing a decentralized, multi-dimensional hash table.

In operation 308, the network 100, e.g., various possible nodes or combinations of nodes, may monitor (e.g., listen)

for the hardware and/or software fingerprint from a node device upon its connection to the network 100. For example, node devices may be configured to transmit their fingerprints to one or more nodes or other computing devices of the network upon activation (e.g., powering up and/or executing a boot program while in communication with the one or more nodes or other computing devices) or based on some other action. In one example, the fingerprint of a device may be stored in memory and the operating system or other software application of the node device may be configured to obtain the fingerprints from the memory and provide the fingerprint to the network. The registration service of the network 100, perhaps operating on many or all of the nodes of the network 100, may monitor for receipt of the fingerprint information from a node device attempting to access or otherwise join the network. In operation 310, the service application may determine if the node device fingerprints are received. If node device fingerprints are not received, the service application may continue to monitor for transmitted node device fingerprints in operation 308.

Upon receipt of fingerprint information from a newly connected node device, a node identifier for the device transmitting the fingerprint information may be generated from the received fingerprint information in operation 312. In particular, the registration service of the network may execute the same hashing function or other algorithm used above in relation to operation 302 to generate the node identifier from the received fingerprint information. As mentioned, the hashing function may be repeatable such that the output of the algorithm is the same when provided with the same input values. In operation 314, the registration service may compare the generated node identifier with the stored node identifiers deployed onto the network above with relation to operation 306. In one particular example, the list of node identifiers associated with manufactured nodes may be deployed onto the network in anticipation of the associated device connecting to the network. Upon establishing communications with the network, the newly connected node device may transmit fingerprint information from which a node identifier may be generated. If the generated identifier from the providing fingerprint information does not match a stored node identifier as including the list of identifiers associated with the manufactured nodes, the registration service may deny registration of the node with the cloudless network in operation 316. For example, a computing device may attempt to fraudulently register as a node of the cloudless network by providing false fingerprint information to the network. However, an identifier generated from the false fingerprint information provided by the computing device may not match a deployed node identifier stored in the network 100 as the information provided by the fraudulent device does not match information provided by the manufacturer of the node devices. In circumstances where the device identifier generated from the received fingerprint information does not match a stored node identifier, registration of the device providing the fingerprint information may be denied as a potential fraudulent node of the network. Additional security operations may occur in addition to denying registration of the device, including reporting the attempt at registering the device as a node, forwarding of the fingerprint information from the device to a security node of the network, including the fingerprint information in a black list stored on the network, and the like.

Upon matching the generated identifier (based on the hardware and/or software fingerprint information provided by the requesting device) to a stored node identifier deployed onto the network, the node device may become a node of the cloudless network 100. In operation 318, geo-location information for the node device may be received, in some instances based on a request for the geo-location information transmitted to the node device. The geo-location of the node device may be associated with the node identifier and stored within the network 100, including with one or more network operation services deployed within the network. As explained in more detail below, the geo-location information of the node device may be utilized to configure the nodes of the network, determine available network resources near a requesting device, determine network capacity for nodes within geographically proximate areas, and the like. In general, the geo-location information of the node device may be in any form or combination of forms indicating a location of the device on the globe, including latitude and longitude coordinates, area code, street address, and the like. In one particular instance, the geo-location information may be obtained by a Global Positioning System (GPS) circuit within the node device, although other methods of determining the geo-location of the node device are contemplated, such as obtaining the location from another computing device in the vicinity of the node device, receiving the location via a user input to the node device, communicating with a geo-location computing device and service, and the like. Geographic location may also be updated in the network when a node device moves within the network and reconnects to the network in a different location. Registering the node device as a node of the cloudless network 100 may further include advertising information associated with the node device to other nodes of the network. For example, a unique network address or other identifier may be provided to the nodes of the network 100 at which communication packets may be transmitted to reach the node device. In one particular example, an IP address of the node device may be advertised into the nodes of the network for storage and use in transmitting packets within the network. The network address may further be propagated through devices in communication with the registered node device essentially defining communication paths to and from the newly registered device and other devices of the network. Other information from the newly registered node device may also be transmitted and stored or otherwise associated with the node identifier. For example, connection information of the node device, such as last known Internet Protocol (IP) address of the node device, a communication protocol for communicating with the node device, one or more communication port identifiers, one or more device identifiers, and the like, may be transmitted to one or more neighboring node devices and stored with the node identifier generated above. In general, any information associated with the node device may be shared, once registered, with other nodes of the network. In one implementation, the information may be used by the neighboring nodes of the network to communicate with or find the device on the network 100. The node device may also provide the node identifier, geo-location, fingerprint information, and any other device-specific information to the nodes of the network. The registration service executed on the various nodes of the network 100 may create, in response to a successful registration of the node device, an entry in a table of network nodes (or other database storing network node information) for use in communicating with the node device and otherwise sharing resources between the nodes of the network.

In operation 320, one or more nodes of the network 100 may provide services and/or applications to the newly registered node device based on the access level associated with the node identifier. As mentioned above, an access level may be associated with the node identifier and deployed onto the network 100 and stored with the node identifier. Thus, the nodes of the network 100 may determine the access level for a newly registered node device (based on the node identifier). The access level for a node device of the network may determine particular services and/or applications available for the registered node or available from the registered node, including services and applications used to manage and control operations of the network 100. Such services and applications may be stored in one or more nodes of the network and made available to the newly registered node in operation 320. In some instances, the node device may be configured to request particular services and/or applications from the network. The request may be received at a node from which the service or application is available to other nodes and a check of the access level of the requesting node device may be completed by the receiving node. If the newly registered node device is associated with an access level that permits providing the requested service and/or application to the node device, transfer of the service or application may occur. In another example, nodes of the network 100 may determine which services and applications are to be provided to the newly registered node device based on the device's access level and automatically begin providing such services and applications to the node device. The node device may then store and, in some instances, execute the provided services and/or applications to operate as a node of the cloudless network 100, as described herein.

Through the operations described above, a computing device may become a node of the cloudless network 100 and begin providing services to other nodes and/or other computing devices. In one instance, the node device may be an interface to access the cloudless network for a personal device to begin receiving services from the network at the personal device. For example and referring to the environment 100 of FIG. 1, node device A 110 may register with the network environment 100 through the process described above. Once registered as a node of the cloudless network 100, the node 110 may provide an interface to personal devices, such as mobile device 106 and/or laptop computing device 108. In other words, the personal devices 106, 108 may access the cloudless network via node A 110 (operating as a gateway into the network) to begin receiving services from the network, such as storage, computing, and/or networking services, among others. In one particular example, the personal device 106 may receive streamed multimedia content from the network via node A 110 for display on the personal device.

Figure 4:
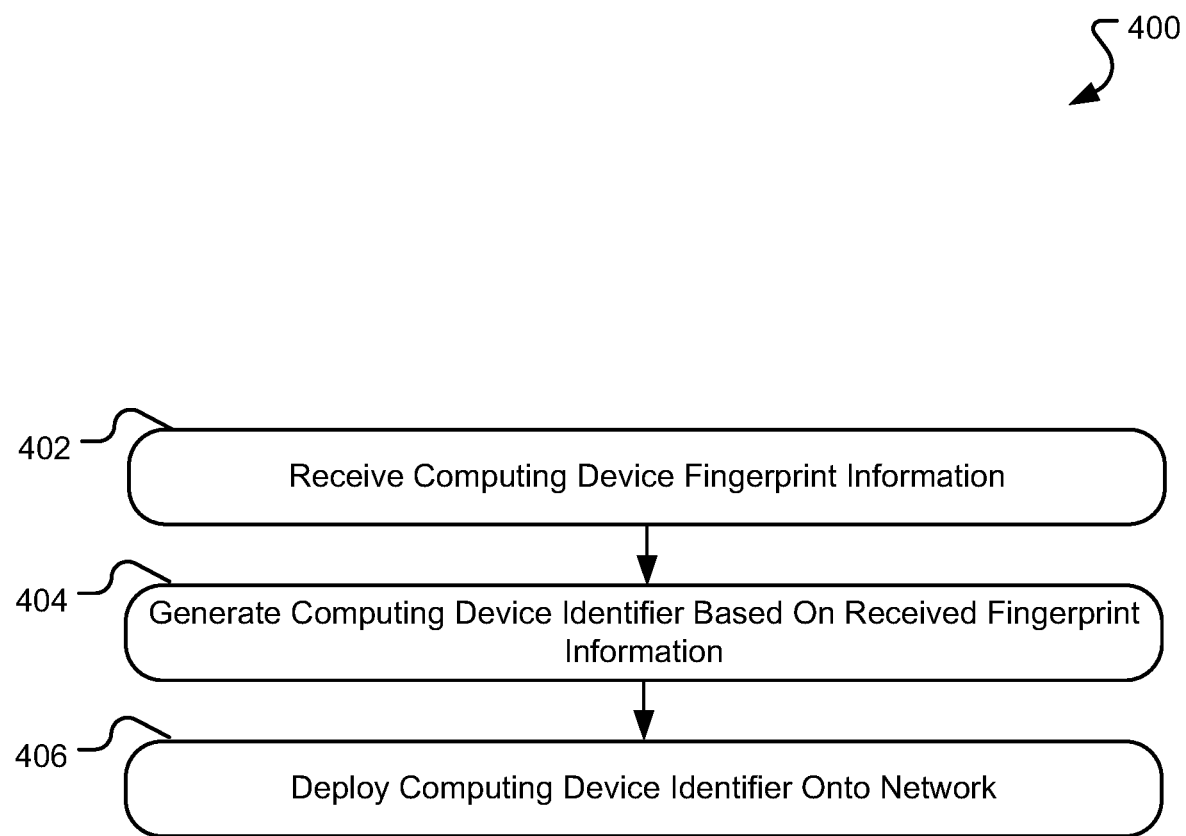
FIG. 4 is a flowchart illustrating one method for generating a device identifier for a computing device communicating with a cloudless infrastructure in accordance with one embodiment.

A personal device connecting to the cloudless network 100 may be associated with a device identifier similar to the node identifier described above to interact with the network devices and services. FIG. 4 is a flowchart illustrating one method for generating a device identifier for a personal computing device communicating with a cloudless network in accordance with one embodiment. In one example, the personal device may be mobile device 106 of FIG. 1, although any computing device may request connection or to receive services from the cloudless network 100. Similar to method 300 described above, the operations of the method 400 of FIG. 4 may be performed by a service and/or application executed on a node of the cloudless network. For example, node A 110 of FIG. 1 may include a service or application for registering personal devices with the cloudless network and may perform the operations of the method 400 of FIG. 4. In other instances, one or more of the operations may be performed by the personal device requesting services from the network and/or other nodes of the network such that the operations may be performed by multiple applications executing on multiple devices of the network. In general, the operations may be executed through hardware components, software programs executed in a processing environment of the nodes or otherwise, or a combination thereof.

Beginning in operation 402, a node of the network may receive fingerprint identifiers or other device related information from the device requesting a network identifier. Similar to above, the fingerprint information may include identification information of the hardware components of the device 106, such as serial numbers, model identifiers, manufacturing information, and the like. The hardware information of the device 106 may be obtained from an application executed on the device and configured to query one or more components of the device for the hardware-based identification information. In some instances, the program executed on the device 106 may combine, utilizing an algorithm of the application, the hardware information of the device into a hardware fingerprint that identifies or is otherwise associated with the particular device. As should be appreciated, different devices may include different types of hardware components such that a hardware fingerprint based on the components of the device may be different than other hardware fingerprints of devices with different hardware components. The application executed on the device may also obtain software information of one or more programs stored on the device to generate a software-based fingerprint. The generation of the hardware and/or software fingerprint information may be the same or similar as that described above with reference to the node device. Regardless of how the device fingerprint information is generated, the device (and, more particularly, the application executed on the device) may transmit the generated fingerprint information to a node of the network for processing by a service and/or application executed on a node of the network.

In operation 404, one or more nodes of the network may generate an identifier for the device 106 based on the fingerprint information received from the device (e.g., a personal device). The generation of the identifier may be the same or similar to that described above in relation to generation a node identifier, in some instances. For example, the one or more nodes may execute an algorithm, such as a hashing function, to convert the hardware and/or software fingerprint information from the device into a unique device identifier. The device identifier may therefore be different than identifiers generated for other nodes and/or devices of the cloudless network 100 such that the device identifier may be utilized to identify the specific device to the network. Other information of the device may also be used to generate the device identifier. For example, connection information of the device, such as last known Internet Protocol (IP) address of the device, a communication protocol for communicating with the device, one or more communication port identifiers, one or more device identifiers, and the like, may be used by the node device to generate the device identifier. Further, because the device identifier is based on aspects of the specific device itself (such as the hardware and software components of the device), the identifier may be linked to the physical device and not a user of the device. In this manner, a user's information is not associated with interactions undertaken with the cloudless network. Rather, only aspects of the device are used to generate the device identifier for use by the network, thereby allowing users of the network to remain anonymous and secure. Rather, the identifiers utilized in the cloudless network may be linked to the devices themselves.

The generated device identifier may be deployed onto the cloudless network in operation 406 for storage in one or more nodes of the network. The one or more nodes of the network may store a received device identifier in a table or other storage configuration of such identifiers for use in communicating with the device, providing services to the device, managing one or more accounts associated with the device, and the like. In general, any interaction with the network by the device may utilize the generated device identifier and may be verified by the nodes of the network via the deployed and stored device identifiers.

The device identifier may be utilized by applications and/or services of the network as a substitute identifier for a user associated with the network, without storing or transmitting personal information of the user of the device. For example, applications and/or services may be configured to use a device identifier as a signature or other identifier of a user, rather than actual user information. Thus, a user of the device may use the device identifier to agree to contracts, purchase goods, log into websites or systems, authorize transactions, and the like without providing sensitive personal information. If the device identifier is ever stolen, the user's personal information is not available from the device identifier and a new device identifier may be generated for the user's new device when the stolen device is replaced. In this manner, the identifier used within the cloudless network may be more secure than other types of user identifiers that typically include some personal information of a user.

Still another identifier may be generated and/or utilized by the network. For example, the network may generate, through a similar manner as described above, an identifier for products, consumer goods, and/or industrial goods. Such an identifier may be used as a product code, which may provide security and/or anonymity. Through one or more of the operations described above, an identifier for individual products or items (as opposed to computing devices or users of the network) may be generated to provide a worldwide inventory of every single item, not by category (such as color or size), but by actual individual item, diminishing or eliminating the possibility for counterfeit identifiers and allowing particular stories for each item. For example, fishing companies may use bins to move the fish through the value chain. However, such bins may be expensive, costing up to $2000 each, and the bins are often lost, stolen or misplaced, resulting in a large loss to the company and, in some instances, the opportunity for the stolen bin to be used to introduce counterfeit or illegal fish into the value chain. By generating a unique product identifier for the bins, counterfeit bins may be identified and removed from the value chain. The product identifier may also be used to track and identify countless other products including cars, vaccines, watches, art, etc. A product identifier may provide a real-time identifier generated on the fly and associated with a good or service. Thus, as the products, such as the fishing bins discussed above, go through the production process, the product identifier may be programmatically and trustfully altered depending on some event that alters the product or indicates the product has been transferred, among other things. Further, the product identifier is truly randomly generated from the entropic measures as discussed below. As product identifiers may have multiple attributes, such as a QR code, a bar code, a RFID, etc., the provenance of the bin may be tracked and traced, including the bins themselves and all the attributes the bin has had in the past. For example, an identifier may be associated with a first action, such as if the bin carried lobster, followed by adding an attribute to the identifier if the bin is used to carry salmon. In another example, products may have the same bar code even though they may be of different quality. The use of the product identifier based on the operations above may remove any confusion over bar codes as the identifiers cannot be replicated, improving the security of the production process.

Fractal Infrastructure of Cloudless Network

Figure 5:
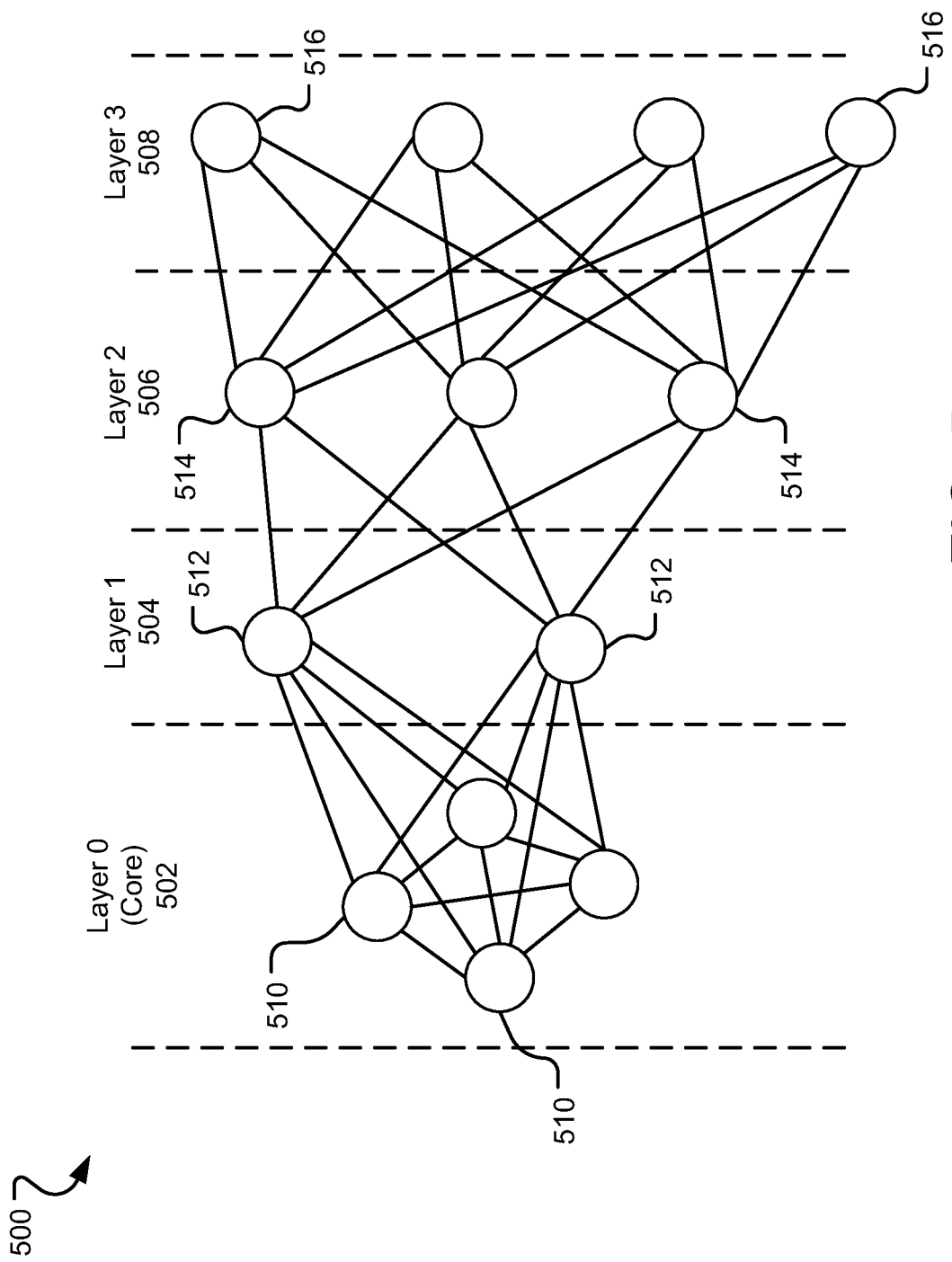
FIG. 5 is a schematic diagram of interconnects between nodes of a cloudless infrastructure using a layered connection scheme in accordance with one embodiment.

Through the registration process described above, nodes (such as computing devices with gateway capabilities, personal computing device, etc.) may be added to the cloudless network 100 to provide additional resources into the network to support available services. However, as the cloudless network continues to grow, the structure of the network may add a processing/communication burden to nodes of the network. For example, a traditional network structure provides for each node to logically connect to each other node in the network for direct communication/sharing of resources between the nodes. However, for a cloudless network that may include hundreds or thousands of nodes, connecting to each other node of the network may quickly overwhelm the resources of a single node of the network as the node attempts to maintain connections to the other nodes. Further, such a network structure may cause "localization" of shared resources in which node resources are shared between a small group of nodes close to each other, while resources of other nodes of the network may not be shared at all. As such, an alternate network structure 500 is illustrated in FIG. 5 which shows interconnections between nodes of a cloudless network using a layered connection scheme. In general, the nodes of the network 500 may be node devices or personal computing devices as discussed above, or any other type of computing device registered with the network for providing or receiving services of the network 500. Each node may register with the network 500 and, upon validation of the registration, may become a node of the network such that the network is scalable to integrate any number of nodes.

In general, each node of the network 500 may logically communicate with any other node of the network. However, for the reasons stated above, the number of nodes in the network may grow to such a size as to overwhelm one or more of the nodes as the nodes try to maintain connections to each other node. In the network 500 of FIG. 5, the nodes of the network 500 may be broken up into layers in a predictable pattern, also referred to herein as a "fractal" pattern, that reduces the number of nodes sharing resources, spreading out the node interconnections within the network such that each node may not necessarily be virtually connected to each other node but may instead be connected to a subset of the other nodes of the network. This may reduce the number of connections for which a node is responsible to maintain, allowing the network to grow without overwhelming the nodes of the network. In one implementation, one or more of the nodes of the network 500 may be assigned or otherwise associated with a layer of the network and may be limited to sharing resources only with nodes associated with a previous layer or the next layer of the network to reduce the number of nodes for which services, resources, applications, etc. may be received.

In some instances, the cloudless network 500 may begin with a core layer (otherwise known as "layer 0") of nodes 510. For example, the cloudless network 500 may begin with a core network of interconnected nodes from which the network may grow. Although layer 0 502 of the network 500 of FIG. 5 includes four nodes 510, it should be appreciated that any number of nodes or computing devices may be included in the core layer. Further, the nodes of the core layer 502 may be fully interconnected such that each node may logically connect to each other node and share resources between the nodes of the core layer. The core layer 502 may be interconnected to provide a base layer through which every node in the network 500 may connect to any other node via at least one path through the core layer. Other connections between the nodes may be established as set out below in addition to the core layer 502. It should be noted that portions of the cloudless network 500 may be included in a cloud environment in addition to portions included in a cloudless environment. For example, the core layer 502 may be hosted in a cloud environment, while other layers or portions of layers may be cloudless and communicate in a peer-to-peer manner.

Although the nodes of the network 500 are illustrated as located physically near each other, the illustrated connections between the nodes indicate logical connections. The node devices may therefore be geographically near each other or disparately located and communicate through any communications network or protocol, as described above. In one example of the network 500, the core nodes may be located at various locations around the world such that each node of the network may be geographically close to a core node device. However, the core nodes may be located in any location. Further, nodes of different layers may be physically near each other and not logically connected within the same layer. For example, a node 516 of layer 3 508 may be geographically located near a node 510 of layer 0 502 (in some instances, within wireless communication range) such that the devices may share a communication link, although the nodes are in different layers of the network. However, such nodes may not be connected logically to share resources between themselves as they are associated with distinct layers (e.g., not in adjacent layers) of the network.

Additional layers of the network 500 may be generated from (and interconnected with) the core layer 502. For example, a layer 1 504 of the network 500 may be generated from additional nodes 512 of the network. The nodes that comprise layer 1 504 of the network may be added to the network upon generation of the core layer 502 through the registration process described above or through some other node addition process. For example, the nodes 512 of layer 1 504 may register with the network 500 through the process described above and be assigned to layer 1. The process of requesting and being assigned a layer designation or identifier is discussed in more detail below with reference to FIG. 11. Regardless of which layer of the network 500 to which a node is assigned, the node may be instructed or include an instruction to limit the connections to other nodes of the network in a layer below or a layer above the node's layer. For example, the nodes 512 of layer 1 504 may be instructed to limit its logical connections to the nodes 510 of the core layer 502 and nodes 514 of layer 2 506. If layer 2 506 is not established within the network 500 at the time a node 512 of layer 1 504 is registered, the node may only share resources with nodes of the core layer 502 until a layer 2 node is registered with the network 500. Limiting the logical connections to the nodes of these layers may include only receiving services and/or programs from the nodes of these layers and not others. Different from the core layer 502, however, the nodes 512 of layer 1 504 may not connect to each other such that the nodes are not fully interconnected within the layer. Rather, the nodes 512 may be limited to logically connecting only to those nodes 510 in layer 0 502 (e.g., n−1 nodes) and nodes 514 in layer 2 506 (e.g., n+1 nodes). Such a network configuration may prevent each node of the network 500 from being taxed with maintaining connections to each other node in the network and from services being siloed between a group of nodes within a particular layer.

In a similar manner, the nodes 514 of layer 2 506 may be instructed or controlled to share resources or otherwise logically connect to nodes 512 of layer 1 504 and nodes 516 of layer 3 508. As above, the nodes 514 of layer 2 may not connect to each other or may not connect to the nodes 510 of layer 0 502. The nodes 516 of layer 3 508 may similarly connect or otherwise communicate with the nodes 514 of layer 2 506. Upon registration of nodes into a layer 4 (not shown), the nodes 516 of layer 3 508 may connect to the layer 4 nodes to share resources. Further, although only a few nodes are shown in each layer of the network 500 of FIG. 5, it should be appreciated that each layer may include many nodes. Further, as explained in more detail below, each layer 502-508 may have an upper limit of a number of nodes for inclusion in each layer such that, once the upper limit of nodes for a layer is reached, no additional nodes may be added to that layer and a new layer may be generated. Thus, although the network 500 of FIG. 5 is illustrated with layer 3 508 having more nodes 516 than layer 2 506, which has more nodes than layer 1, it should be appreciated that the layers 502-508 may be configured to include any number of nodes per layer, sometimes with varying number of nodes from layer to layer.

FIG. 5 illustrates layers emanating linearly left to right from the core layer outward to the outer layer 3. This arrangement, however, is presented merely for illustrative purposes. In some examples, layers will emanate outward somewhat concentrically from the core. Regardless, the layers may emanate outward from the core in any number of directions, and the form or number of layers will depend on the implantation and the number of new devices in any given layer joining the network, as well, as the physical location of the various devices joining the network in any particular area. So, for example, a core in an area may form concentric layers around the core as the network grows outward into the geographic area surrounding the core. In some instances, a node of a layer may be designated as a core node and a sub-network may extend from the new core node in a similar connective manner as above. For example, a node 512 of layer 1 504 of the network 500 of FIG. 5 may be a core node or otherwise initiate a new sub-network. In this example, node 512 may logically connect to each of another layer of nodes (separate from the layer 2 nodes 514) as a core node for the sub-network. The layering of nodes may continue building off of the node 512 of layer 1 504 as the core node for that sub-network. The node 512 may, in this instance, continue to function as a layer 1 504 node as described herein in relation to the network 500 of FIG. 5 and as a core node (with core node functionality) for the sub-network of node devices. This fractal pattern may continue, building from any node as a core node for a sub-network of other node devices. The conversion of a registered node to a core node for a sub-network of devices may be based on any performance characteristic of the nodes of the network, as described herein in relation to adding a newly registered node into a layer of the network 500.

To limit the nodes of the network 500 from which a particular node may receive services or otherwise share resources and thereby logically connect to, one or more nodes of the network may execute a service or application that manages the logical connections to other nodes within the network 500. For example, a node 512 of layer 1 may, perhaps in response to a request for a network service received from a personal computing device in communication with the node, request a service and/or resources from another node of the network 500. This request may be made in circumstances in which node 512 of layer 1 does not have the requested service loaded or stored on the node device. The request to the other nodes of the network 500 for the requested service may include a requested layer identifier, such as a layer identifier for layer 0 502 or a layer identifier of layer 2 506. The layer identifier may thus be limited to n+1 and/or n−1 layers, where n is the layer to which the requesting device is assigned (in this example, layer 1). Nodes of layers other than layer 0 or layer 2 may ignore the request transmitted by the node 512 of layer 1 to provide or share the resources with the layer 1 node 512. For example, if the request is received at a node that is also associated with layer 1 504, the request may be ignored by the receiving node. Similarly, if the request is received at a node of layer 3 508, the request may be ignored. However, if the request is received by a node 510 of layer 0 502 or a node 514 of layer 2 506, a logical communication path between the nodes may be established and the resources may be shared with the node 512 of layer 1 504. In another example, each node of the network 500 may maintain a list of layer identifiers of one or more other nodes and may target certain nodes within the network 500 from which the requesting node is allowed to share resources. For example, the node 512 of layer 1 504 may be configured to only request the service from the nodes of layer 0 502 and the nodes of layer 2 506, rather than a general broadcast to any node near or neighboring the requesting node. Regardless of the process, the nodes of the network 500 may be limited to communicate with nodes of one layer above or one layer below the layer of the requesting node to share resources across the nodes of the network.

In some implementations, a set of nodes of the network 500 may act as a single node of the network. For example, assume that a building includes ten nodes of the cloudless network 500. A user of the network may desire to consume a service from the network, such as accessing content such as a movie. The movie file, however, may be too large to be stored in the user's node device or on any one node device of the building or within a broadcast area of the user's node. Through the fractal network structure, however, all or a subset of the nodes within the building may act as a single node for the user or other users of the building. Playing the movie then will involve accessing the content at a content source, uploading the content to some combination of nodes proximate the requesting node, and then coordinated streaming from the nodes and appropriate buffering at the requesting node device. The infrastructure therefore allows for the definition of a number of nodes to be used (based on CPU, storage, or any other aspect) to hold a file or provide a service. In some instances, a single node will be sufficient to provide a service, e.g., store and stream content, and will be sufficient to provide many such services. In this example, the file may be fragmented into smaller pieces and deployed to the nodes. The services of the used boxes may be rented during the use and the users associated with the used nodes may be compensated in some manner. Access to the service or file may then be provided to all other nodes of the shared node, within the parameters of the density of that portion of the infrastructure, as explained in more detail below. The sharing of resources among nodes may be made on demand and may generally follow a first in, first out process. Content may be saved in the combination of nodes for a period of time to accommodate subsequent requests for the same content.

Figure 6:
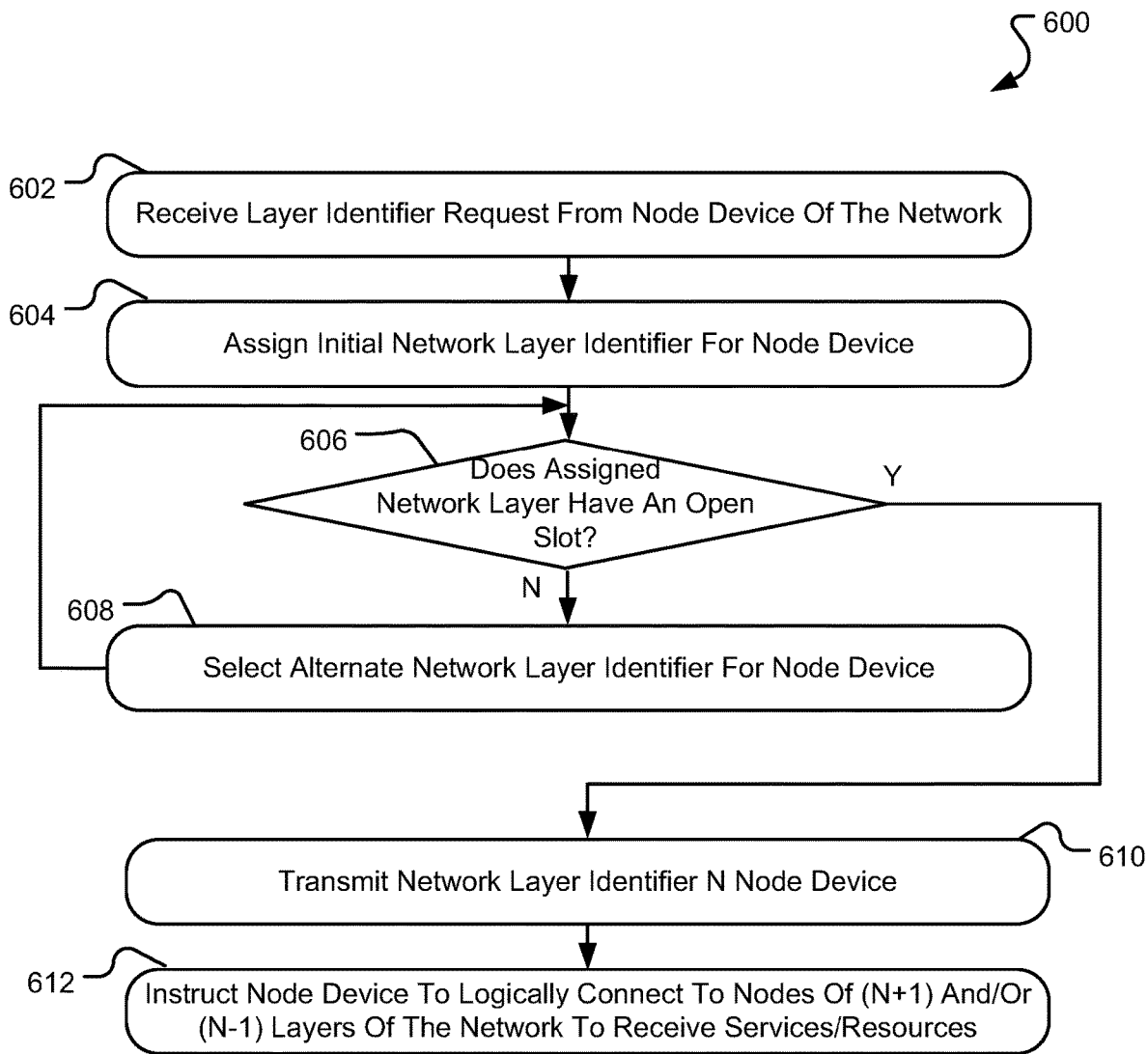
FIG. 6 is a flowchart of a method for assigning a network layer identifier to a connected node of a cloudless infrastructure in accordance with one embodiment.

As mentioned above, the fractal structure of the network may be created as the network 500 grows through addition of more nodes/computing devices into the network. FIG. 6 is a flowchart of a method 600 for assigning a network layer identifier to a connected node of a cloudless network in accordance with one embodiment. The network layer identifier assigned or provided to a node of the network may be used to determine which other nodes a logical connection may be established with by the node, as discussed above. In the method 600, a service executed on the network (or more particularly, on one or more nodes of the network) may determine and assign a network layer identifier to a newly registered node. In another implementation, the newly registered node itself may perform one or more of the operations of the method 600 to register with the network 500 and begin sharing resources with other nodes of the network. The operations of the method 600 may be performed via one or more hardware components of a node or nodes of the network, one or more software programs executed by the node of nodes, or a combination of both hardware and software components.

Beginning in operation 602, the network 500 (or more particular, a node or nodes of the network executing a network layer management service) may receive a layer identifier request from a newly registered node device or other computing device. The layer identifier request may be generated by the node device as a part of the registration process with the network or may occur after the device is registered and a network identifier is associated with device. In operation 604, an initial network layer identifier may be assigned to or otherwise associated with the requesting node device. In one implementation, the initial network layer identifier may indicate that the node device is associated with layer 0 502 (or the core layer). In other implementations, the initial network layer identifier may be another layer of the network 500, such as the network layer identifier determined by the service. Regardless, the initial network layer identifier may be provided to the requesting node device or may be maintained by the layer management service in another node of the network 500.

In operation 606, the network layer management service may determine if the assigned network layer for the node device has an open slot. As mentioned above, one or more of the layers of the network 500 may include an upper capacity for the number of nodes allowed for that layer. Upon reaching the upper capacity for the number of nodes, additional nodes may not be assigned to that particular layer. The upper capacity for a layer may be based on any processing, storage, or networking capability of the nodes of the layer, the node to be assigned to a layer, the capabilities of nodes of other layers, or any other performance consideration of the network as a whole, a portion of the network, or any device or devices of the network. However, in some instances, any number of nodes may be included in a layer if the performance capabilities of the layer allows for more nodes within the layer. Thus, in operation 606, the service may determine if the layer indicated by the assigned network layer identifier is full or if additional nodes may be associated with that layer. For example, the initial network layer identifier assigned to a new node device may be associated with layer 0 502. However, depending on the previous growth of the network and the number of registered nodes, layer 0 may already have the maximum number of nodes 510 assigned to that layer.

In one implementation, the number of nodes within a layer may depend upon a connectivity limitation or capability of the devices of the layer. For example, a layer may include node devices that are limited to connect to up to 50 other devices at one time. During the registration process, this connection capacity of the node devices of a layer and the number of devices connected to the devices within the layer may be determined. If one or more of the devices within the layer have reached a capacity of connections to other devices based on the determined connection capacity, a registering node may not be assigned to a layer of the network that would exceed the connection capacity for the network devices. For example, if a node in layer 2 506 has reached a connection capacity, additional nodes may not be registered into layer 3 508 as such a layer assignment would exceed the connection capacity for the layer 2 device. Rather, the registering device may be assigned to a layer 4 (not shown) or a layer 4 may be created and assigned to the registering device. In this manner, determining a layer to assign to nodes of the network 500 may be at least partially dependent on a connection capacity of one or more other nodes. In a similar manner, processing capabilities, storage capabilities, network speed capabilities, and any other performance capabilities of limits of the nodes of the network 500. In one implementation, the density values for the nodes of a layer may be considered when assigning a layer indicator to a registering node. The concept of density values for a node are explained in greater detail below.

If the assigned layer is full or the registering node can otherwise not be assigned to a layer, the service may, in operation 608, select an alternate network layer identifier for the requesting node device. In one instance, the alternate network layer may be the next layer up from the assigned layer identifier. For example, assuming the initial network layer identifier indicates layer 0 502 for the node device, the service may determine that layer 0 502 has reached the maximum number of nodes for that layer. The service may then assign or otherwise associate a layer identifier for network layer 1 504 to the node device. In another implementation, the alternate network layer may be the next layer down from the assigned layer identifier. In still other implementations, the alternate network layer may be the randomly selected from the layers of the network 500 or may be based on a performance characteristic or capability of the nodes of a layer or any number of layers.

Upon selecting the alternate network layer identifier for the node device, the service may again determine if the assigned network layer identifier has an open slot in operation 606. This process of checking for an open slot and adjusting the network layer identifier for the node device may continue until an open slot within a layer of the network 500 is found. Upon determining the assigned network layer has an open slot for addition of a new node, the assigned network layer identifier N may be transmitted to the node device in operation 610. In addition, the service may instruct the requesting device to logically connect to other nodes of the network that belong or are otherwise associated with an N+1 layer and/or an N−1 layer to receive services/resources from nodes of those layers in operation 612. In some instances, the instructions provided to the node device may manage which requests the node may respond to based on the network layer identifier associated with the node. For example, rather than instructing the node device to only logically receive services/resources from particular nodes of the network based on the layer identifier, the instructions may control which requests for services/resources the node device responds to based on the layer identifier. Regardless of the implementation utilized, the method 600 may be executed to assign or otherwise associate a network layer identifier with a requesting node of the network 500 and to manage to which other nodes in the network the requesting node may logically connect.

Security/Encryption of Network Components

Figure 7:
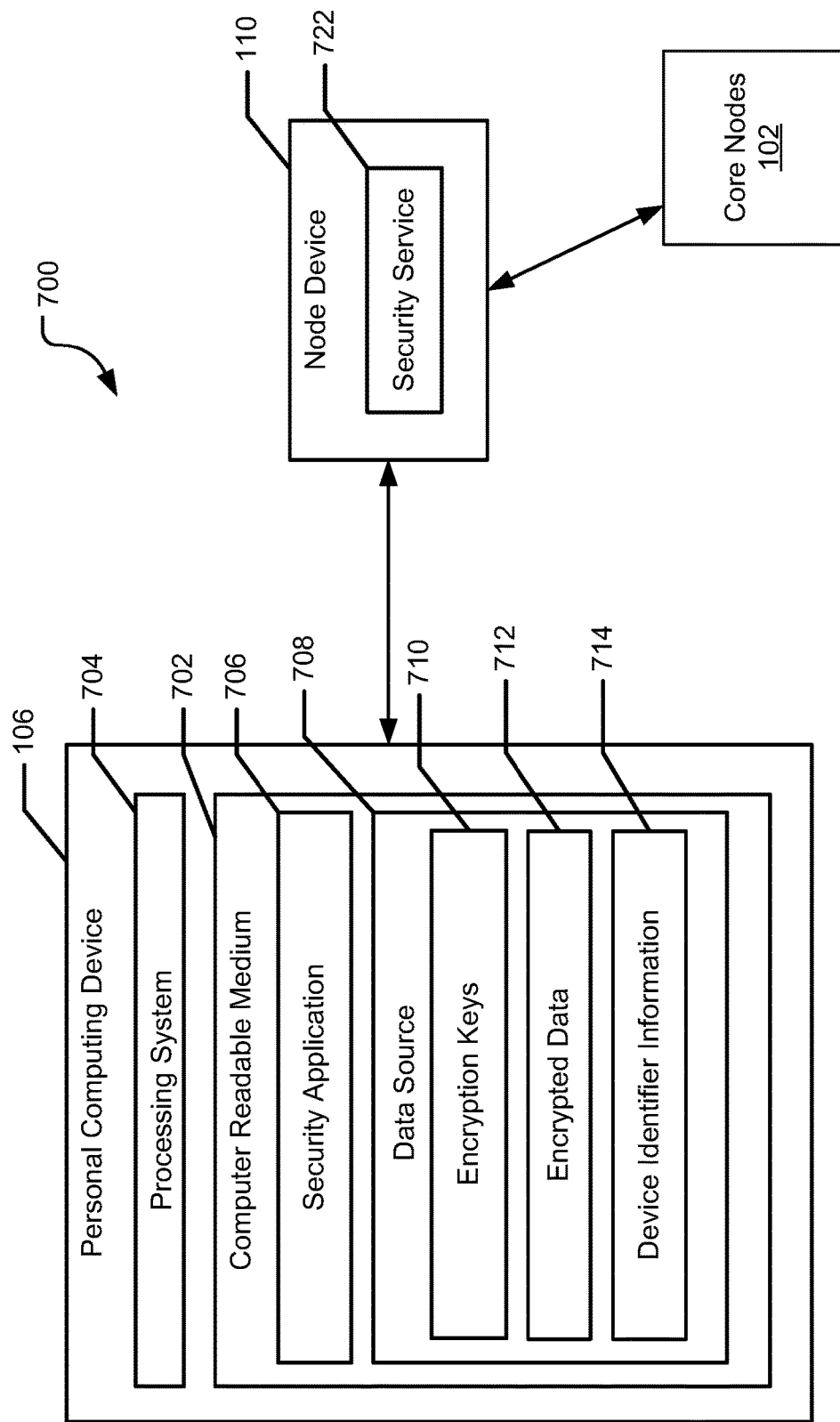
FIG. 7 is a schematic diagram illustrating an exemplary operating environment for providing secure interactions with a cloudless infrastructure in accordance with one embodiment.

In addition to the device identifier, other security measures, features, and/or services may be associated with the cloudless network to ensure safe and reliable interactions with the network. FIG. 7 is a schematic diagram illustrating an exemplary network operating environment 700 for providing secure interactions with a cloudless network in accordance with one embodiment. The environment 700 includes a cloudless network of devices 102, a node 110 providing access to the cloudless network, and a computing device in communication with the node to receive one or more services from the network. The network of devices 102, node 110, and computing device 106 may be the same or similar to the devices discussed above with reference to FIGS. 1 to 4, although the computing device may be any computing device, such as a mobile computing device, a laptop, a tablet, etc. Also, the node 110 may be any node or computing device of the cloudless network in communication with the computing device 106. In one instance, one or more other nodes may be logically positioned between the computing device and the node such that communications between the devices may occur over any number of nodes of the cloudless network. In general, the node 110 may be one or more nodes of the cloudless network 102 executing a security service application 722 or program to provide secure transmissions to devices connected to the network.

FIG. 7 includes an example personal computing device 106 in communication or otherwise associated with the cloudless network 102 which may receive services from the network, such as compute services, storage services, networking services, security services, and the like. While the term "personal" computing device is used to reference device 106 and the device may be associated with a particular user in some instances, the device is not limited to so-called personal computing devices and may be other forms of devices including IoT devices, various network devices, nodes as described herein, servers, etc. In general, the user of the term "personal computing device" is used herein to differentiate from node devices 110 and core nodes 102 of the network 100. In some instances, the personal computing device 106 may include a processing system 704 for executing a security application 706 stored in a computer readable medium 702. The security application 706 may be executed to facilitate secured communications with devices of the cloudless network 102, such as node device 110. By way of example and not limitation, non-transitory computer readable medium 702 comprises computer storage media, such as non-transient storage memory, volatile media, non-volatile media, removable media, and/or non-removable media implemented in a method or technology for storage of information, such as computer readable instructions, data structures, program modules, or other data.

The security application 706 may also utilize a data source 708 of the computer readable media 702 for storage of encrypted data and other information associated with the security application 706 or other applications stored on and/or executed by the personal computing device 106. For example, the security application 706 may store security and/or encryption information and data, such as encryption keys 710 (both private and public encryption keys), encrypted data 712 for use by applications of the personal computing device 106 and the network 102, device identifier information 714, and the like. In one particular example, the device identifier for the personal computing device 106 may be obtained from the network 102 based on the method 400 of FIG. 4 and stored in the data source 708, either encrypted or non-encrypted. In general, any data or information utilized by the personal computing device 106 may be encrypted and/or stored in the data source 708 and accessible via the security application 706 executed by the processing system 704 of the personal computing device 106.

Figure 8:
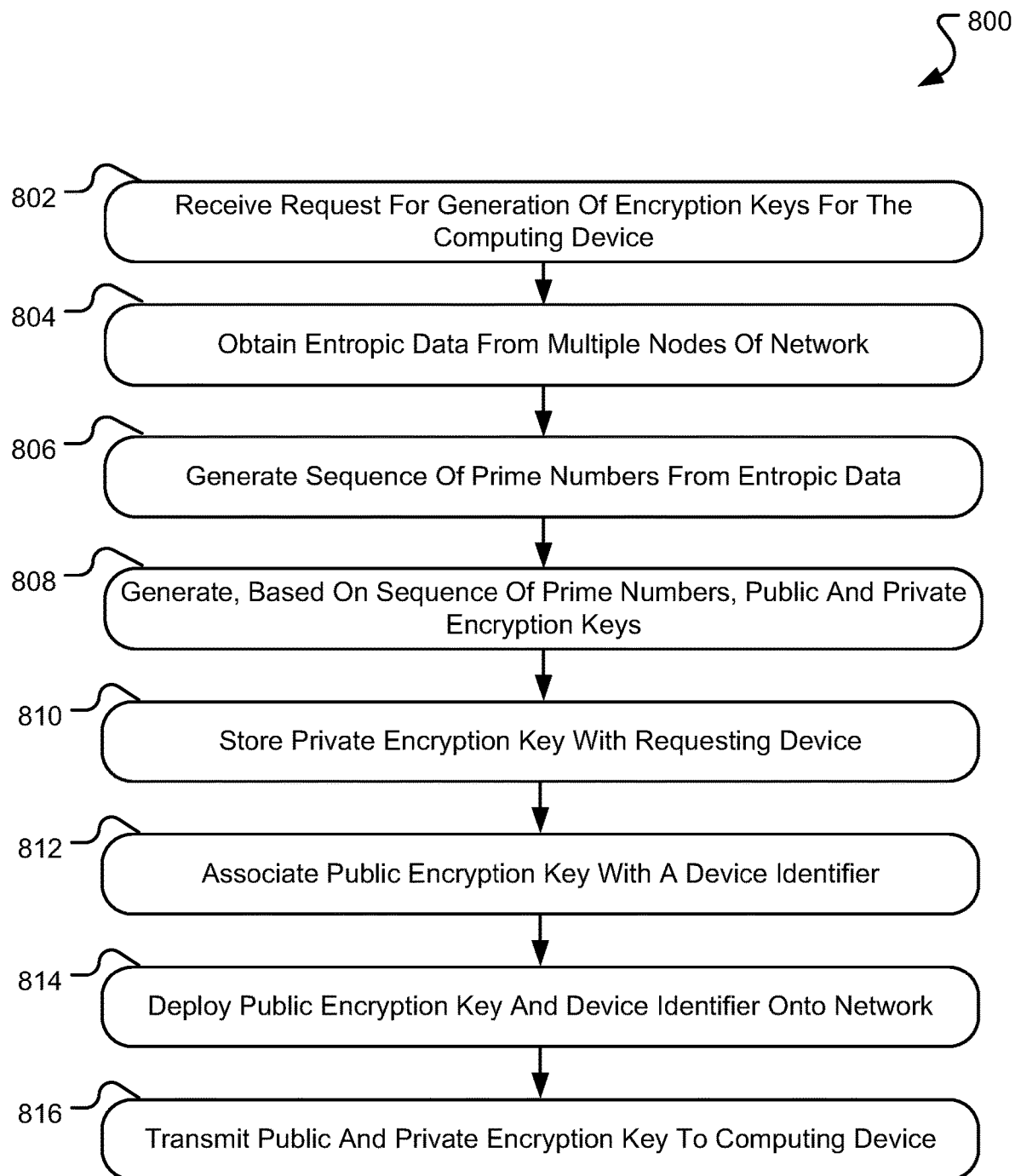
FIG. 8 is a flowchart illustrating one method for generating encryption keys for a computing device associated with a cloudless infrastructure in accordance with one embodiment.

As mentioned above, the cloudless network may provide a security service 722 to personal devices (or any other devices associated with the network). The personal computing device 106 may utilize the security service 722, in one instance, to generate encryption keys for use in encrypting communications and/or data for secure communications across the cloudless network. More particularly, the personal computing device 106 may access a security service 722 of one or more node devices of the network and request encryption keys from the network as generated by the security service. In response, the security service 722 of the network may execute the method 800 illustrated in FIG. 8. In another instance, the security application 706 of the personal computing device 106 may execute a program to generate the encryption keys for the device. Thus, each device of the cloudless network may request generation of encryption keys from a service of the network or may execute a security application to generate the encryption keys for the device. In either regard, the security service/application may perform the operations of the method 800 of FIG. 8 to generate encryption keys for a computing device 106 associated with a cloudless network. In one embodiment, the operations of the method 800 may be executed by one or more nodes of the cloudless network 102 via a security service program 722 executed on the one or more nodes. In general, the operations may be executed via hardware components of the one or more nodes, software programs of the one or more nodes executed in a processing environment of the nodes or otherwise, or a combination thereof.

Beginning in operation 802, the security service 722 or security application 706 may receive a request to obtain one or more encryption key pairs for encrypting data, information, communications, and the like associated with the computing device. As mentioned above, the security service 722 may be distributed across multiple nodes of the cloudless network 102 which may work in tandem to provide the security service for the computing device 106. In other instances, a security application 706 stored and executed by a corresponding computing device may begin the process of generating encryption keys for the device itself. The request for the encryption keys may include, in some instances, a device identifier generated via the method 400 illustrated in FIG. 4 or the method 300 of FIG. 3 and any other computing device information that may be utilized to generate the encryption keys for the computing device. In another example, a security application 706 may be loaded and executed on the computing device 106 to obtain or generate the encryption keys for the device.

In operation 804, the security service 722 or security application 706 may obtain entropic digital data from one or more nodes of the cloudless network. In particular and as explained above with reference to the node device 200 of FIG. 2, the nodes of the network may include one or more entropic data collectors 220 configured to obtain entropic digital data for use in generating encryption keys for the network. In one example, the entropic data collectors 220 may include one or more environmental sensors to obtain a temperature, humidity, atmospheric pressure, light, and/or sound measurements, and the like from the environment around the node device. The environmental measurements may be obtained at different times of the day to obtain varied measurements of an environment around the node device 200 or personal computing device 106. Further, the measurement values may be expressed in any corresponding measurement units or scale. For example, temperature measurements may be expressed in degrees Celsius, degrees Fahrenheit, degrees Kelvin, etc. Sound measurements may be expressed in decibels, sones, phons, etc. Other types of entropic data may also be obtained for computing devices of the cloudless network that are associated with a user. For example, a personal computing device 106 in communication with the cloudless network may obtain one or more bio-measurements of a user or users within the vicinity of the device, such as body temperature, heart rate, accumulated steps in a time period, etc. The user-related data may similarly be expressed in any corresponding measurement units or scale. In yet another example, entropic data may be provided to the entropic data collector 220, such as through a keyboard or other input device to the node device 200. In general, any randomized or entropic digital data may be obtained by the entropic data collector 220 of the node device 200. Further, the entropic data may be constantly changing over time such that the entropic data collectors 220 may provide a source of entropic and random data or information.

The accumulated entropic digital data may be stored at the respective node or device that obtains the data, in one instance of the operations of the network. In another instance, the nodes and/or computing devices of the network may be configured to transmit the obtained entropic data to a database, service, application, or the like of the network. Thus, the entropic information may be obtained or received from any number of nodes of the network over the geographic footprint of the cloudless network. For example, temperature measurements from a device in Brazil, humidity measurements from a device in England, a heart rate of user in Australia, a sound measurement from a device in New York City, and more may be obtained and used by the method 800 described herein. To improve the randomness of the entropic data, the device location and type of data may be randomly selected from the nodes of the network and the available information.

The security application 722 may request the entropic data from one or more selected nodes of the network, in one instance. In another, the security application 722 may communicate with a database of such information configured to collect the entropic information from the nodes of the network 100 and store the information for use in generating an encryption key pair. Regardless of the method by which the entropic information is obtained, the security application 722 may generate a sequence of prime numbers from the entropic data in operation 806 of method 800. More particularly, the security application 722 may execute an algorithm that transforms the entropic values into a sequence of prime numbers, such as through a hashing function or other mathematical algorithm. Further, because the inputs to the algorithm are randomized as obtained from a random collection of data from a variety of locations/devices, the sequence of the prime numbers is similarly randomized. In operation 808, the security application 722 may generate, based on the sequence of prime numbers, a pair of encryption keys for the personal computing device 106 that the personal device may utilize to encrypt data associated with the device. In one instance, an encryption key may be generated from the entropic information in a symmetric-key encryption scheme. In such an encryption scheme, data may be encrypted using the encryption key and decrypted using the same key.

In another instance, the pair of encryption keys generated from the entropic data may be a pair of public and private encryption keys for use in an asymmetric encryption scheme. In some instances, the sequence of prime numbers generated from the entropic data may comprise the public encryption key and/or private encryption key for the personal computing device 106. In another instance, the sequence of prime numbers may be transformed, utilizing a mathematical algorithm, into a public and/or private encryption key. The generated private encryption key for the requesting device may be stored with the requesting device in operation 810. For example, security service 722 may perform the above operations for node 110 to generate a private encryption key for the node, which may be stored at the node. In another example, the security application 706 of the personal computing device 106 may perform the above operations for the personal device to generate a private encryption key for the device, which may be stored in the data source 708 as encrypted key 710. In still another example, security service 722 of the node 110 may generate the private encryption key for the personal computing device 106 and transmit the private encryption key to the personal computing device for storage in the data source 708. As explained in more detail below, the private encryption key may be used by corresponding device of the network for which the key is generated to encrypt data, communications, information, etc. associated with the device.

In operation 812, the generated public encryption key may be associated with a device identifier for which the encryption key is generated. For example, the public encryption key generated for node 110 may be associated with the node identifier of the node, perhaps generated via the method 300 described above with reference to FIG. 3. In another example, the public encryption key generated for personal computing device 106 may be associated with the device identifier of the personal computing device, such as generated via the method 400 described above with reference to FIG. 4. In operation 814, the public encryption key and the associated device identifier may be deployed onto the cloudless network 102 for storage. The public encryption key and associated device identifier may be stored in any number of nodes of the cloudless network 102 and may, in some instances, be managed by the security service 722 executed on one or more of the nodes of the network. Further, in operation 816, the generated public and private encryption keys may be provided to the requesting computing device for use in encrypting device and/or communications associated with the computing device. Through the method 800, one or more encryption keys for the devices of the cloudless network 102 may be generated from the entropic data obtained from the nodes of the network.

The devices of the cloudless network may utilize the encryption keys to encrypt transmissions and/or data associated with the network. For example, the encryption public key for a particular device of the network may be identified based on the corresponding device identifier and used to encrypt communications, data, information, and the like sent to the device identified by the device identifier. The device associated with the public key may, in turn, utilize the private encryption key to decrypt the encrypted data. In a similar manner, the device may utilize the private encryption key to encrypt data which may be decrypted by another node of the network utilizing the public encryption key. In general, any data, communications, information, etc. associated with the network and/or devices of the network may be encrypted utilizing the generated encryption keys. As shown in the environment 700 of FIG. 7, the personal device 106 may store encrypted data 712 in the data source for use by applications executed by the device. Such encrypted data may include passwords (such as a WiFi password for accessing a node device), wireless network encryption, personal information, data used by applications and/or services of the network, communications transmitted via the cloudless network, and the like.

In addition, the entropic data obtained from the entropic data collectors 220, as illustrated in node device 200 of FIG. 2, allows for the rotation of encryption key pairs at a faster rate than in other encryption systems. Traditional encryption keys are rotated or refreshed, on average, every six to twelve months because of the computationally-intensive difficulty in generating a random sequence of prime numbers from which encryption keys may be based. Through the use of the entropic data, however, the more random base of information from the entropic data may be leveraged to reduce the compute power needed to generate the sequence of prime numbers. As a result, the encryption keys may be generated at a faster rate such that rotation of such keys may occur more frequently when compared to other encryption schemes. This increase in encryption key rotation may reduce the opportunity for a malicious third party to obtain or recreate the encryption key pair and fraudulently access a user's encrypted data as each encryption key may be used for a shorter period of time than previous encryption key systems.

The entropic data may also be processed or analyzed by correlating the data to network and/or social events occurring within the geographic area from which the data is obtained. For example, data obtained from a particular node may be associated with a geographic area of the node's location and further associated with events within the same geographic area. Such correlations may allow extraction of statistical data from the entropic data, such as news, weather, crime, and the like. The correlated data may, in some instances, be commoditized in a safe and anonymous manner while linking the digital world to real world events. Because the data is not targeted or based on individuals but rather devices, the anonymity of individuals associated with the data is maintained, while still providing the obtained and analyzed information. For example, when a low barometric pressure is measured in a certain area, analysis of the data may be correlated to a certain time frame of certain food consumption to extract an understanding of how barometric pressure may correspond to food consumption. Additional examples include corresponding the data to entertainment consumption and/or ordering certain products or goods to gain an understanding of how environmental or other data may correlate to particular habits of users within an area. In some instances, users of the network may sell their correlated data for some type of compensation, providing an additional incentive for users to use and interact with the network of interconnected devices.

Network Resource Sharing Management

Figure 9A:
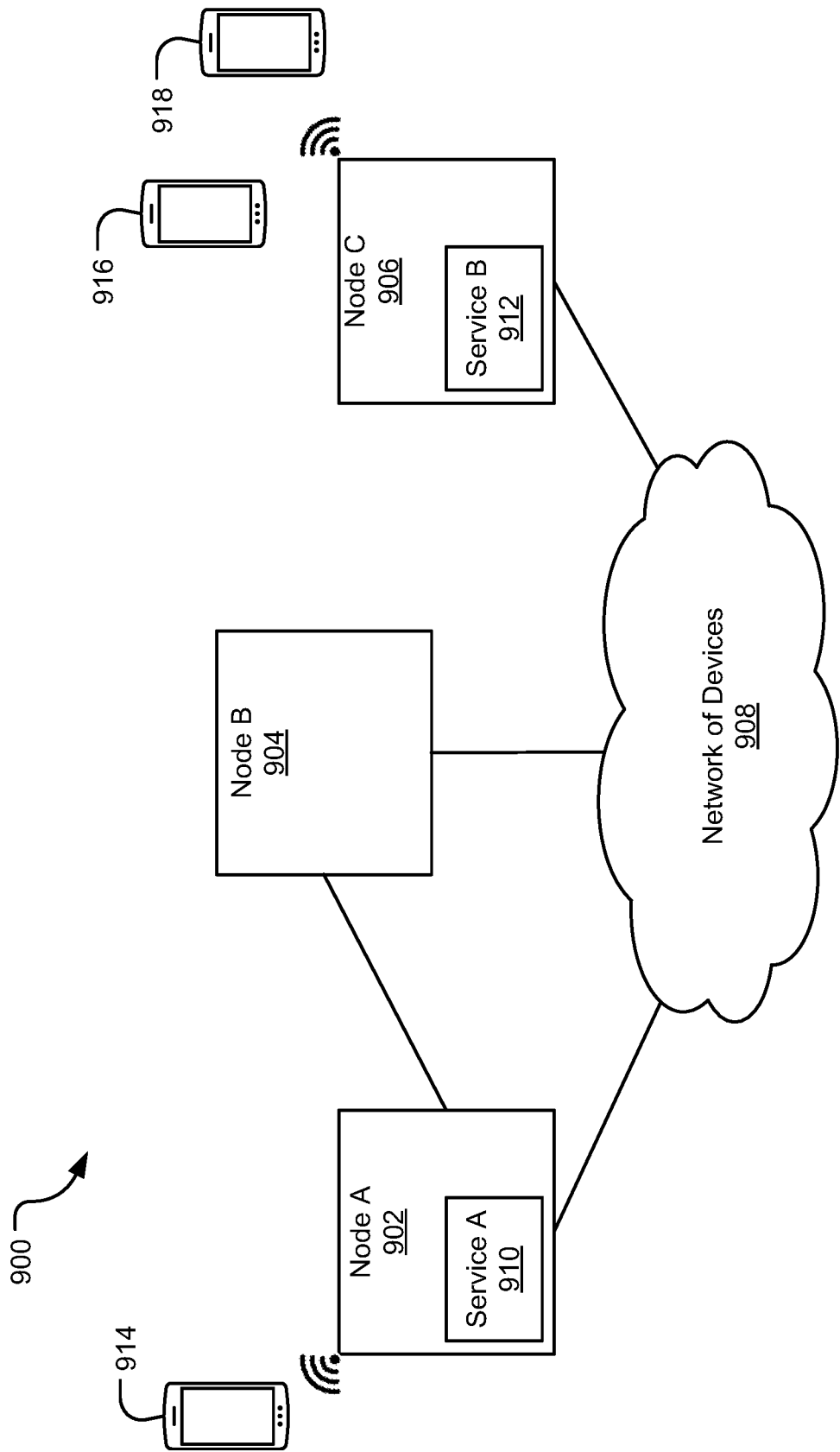
FIGS. 9A and 9B illustrate distribution of resources among nodes of a cloudless infrastructure based on a density value of node resources in accordance with one embodiment.

As mentioned above, the resources of nodes of the cloudless network may be shared. So, for example, a service, which may be running on a computing device using the network, may share resources of nodes, such as compute power, data storage, processing speed, and the like, to provide the service. In one implementation, one or more nodes or devices of the network may generate and utilize a numerical value, also referred to herein as a "density" value, of the available or consumed resources of the devices of the network to manage sharing of resources among the nodes. FIG. 9A illustrates the distribution of network resources among nodes of a cloudless network based on a density value of node resources in accordance with one embodiment. The components of the network environment 900 of FIG. 9A are the same or similar to those described above. In particular, FIG. 9A includes a cloudless network of computing devices 908 interconnected as described above and including node device A 902, node device B 904, and node device C 906, one or all of which may be a node device as described above. The node devices 902 to 906 may be in communication with the cloudless network of device 908 and/or each other, either through a wired or wireless connection. In addition, one or more personal computing devices 914 to 918 may be in communication with one or more of the node devices 902 to 906, either through a wired or wireless connection. The nodes 902-906 and/or personal computing devices 914 to 918 may register with the cloudless network 908 and receive a unique device identifier via the methods described above and may encrypt communications and/or data via encryption keys as described above.

As illustrated in the network environment 900, node A 902 may have an instance of service A 910 installed on the node for availability to personal computing devices, such as mobile phone 914, to receive the associated service. For example, service A 910 may include a security service for an application executed on the personal computing device 914 to encrypt data, generate and provide encryption keys, or provide other types of security features. Similarly, node C 906 may have an instance of service B 912 installed on the node and available to personal computing devices 916. For example, service B 912 may be a service to provide multimedia content to personal computing devices 916 via an application executing on the personal devices. Service B 912 may therefore provide Domain Name Server (DNS) services, manage communications with content providers, cache multimedia content, and the like. In general, however, the services 910, 912 installed on the respective nodes of the network 908 may provide any network service to connected devices 914 to 918.

In one instance, personal computing device 918 may connect or register with node C 906 to access services available from the cloudless network 908, via the registration process described above or by providing a previously registered personal computing device identifier. Once connected to the cloudless network of devices 908, an application executed on the personal computing device 918 may request a particular service from the network. In one example, the requested service may be service A 910. Node C 906 may determine, in response to the request, that service A 910 is not installed on the node to provide the service to the requesting device and may begin a process of downloading, from the devices of the cloudless network 908, the service for execution on node C 906. However, service B 912 may consume a large amount of the resources of node C 906 such that node C may not have enough available resources (storage space, processing speed, etc.) to download and execute the requested service. In this circumstance, node C 906 may utilize resources from other nodes of the network to provide the requested service to the personal device 918. In one particular example, a density value indicating or otherwise associated with available node resources may be associated with one or more nodes of the network and may be used by node C 906 to determine the sharing of resources among the nodes.

Figure 10:
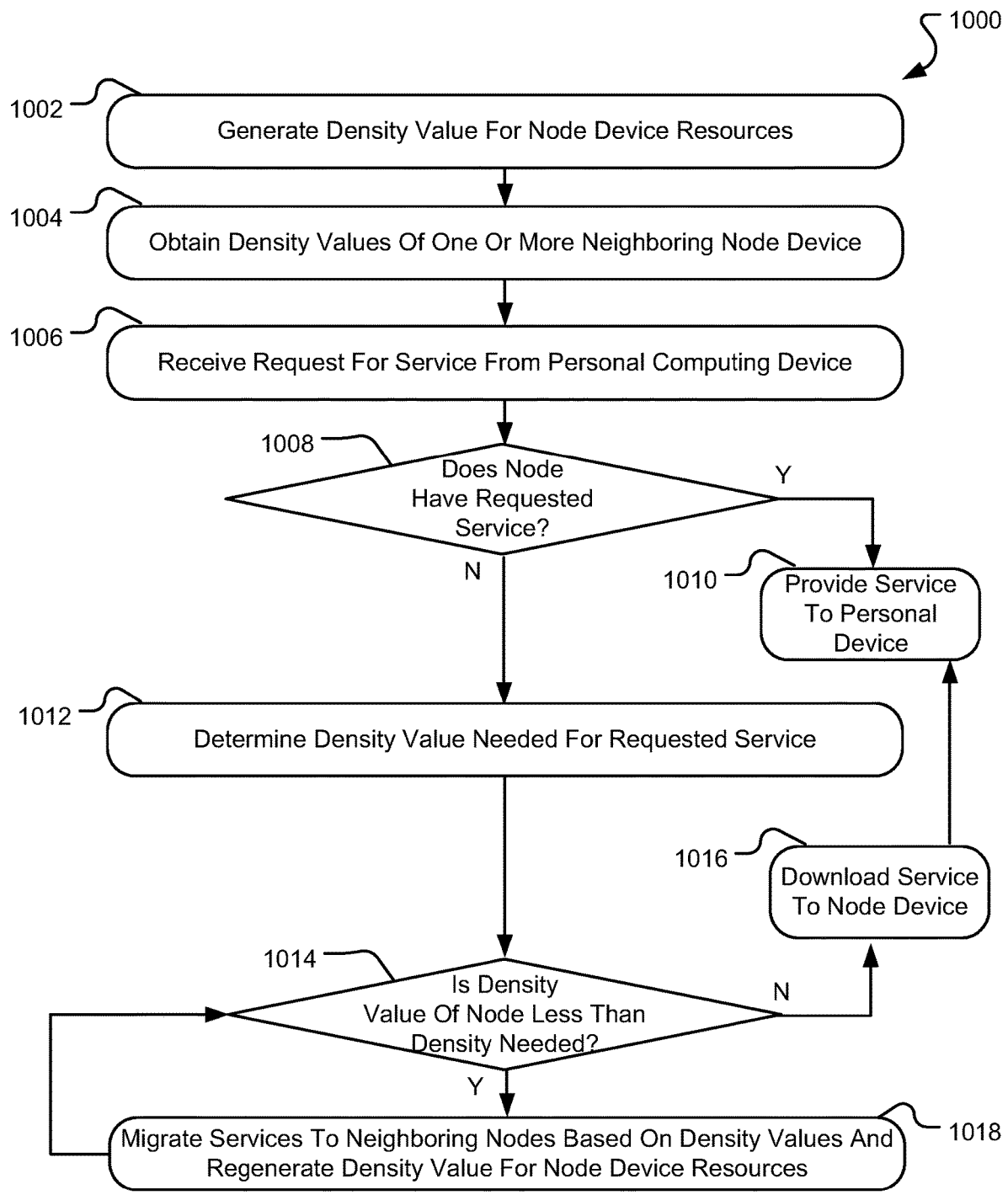
FIG. 10 is a flowchart illustrating one method for distribution of resources among nodes of a cloudless infrastructure based on a density value of node resources in accordance with one embodiment.

FIG. 10 illustrates a flowchart illustrating one method 1000 for distribution of network resources among nodes of a cloudless network based on a density value of node resources in accordance with one embodiment. The operations of the method 1000 of FIG. 10 may be performed by a node of the network, such as node C 906 of the network environment 900 of FIG. 9A. In some implementations, one or more of the operations may be performed by multiple nodes of the cloudless network, including being performed by a node of the network dedicated to management of network resources among the nodes or other computing devices. The operations may be performed through execution of a service or application by the nodes of the network which may communicate with other executed services to manage the sharing of resources of the nodes.

Beginning in operation 1002, a density value for device resources of a target node of the network may be obtained or generated. For example and returning to the example of FIG. 9A, personal computing device 918 may request service A 910 from node C 906 such that node C may be referred to as the "target device" or "target node" for which resources of other nodes may be needed to provide the requested service. To determine the density value for node C 906, available device resources of the target device may be determined or obtained. For example, node C 906 may have particular resources for operating as a node in the network, such as one or more processors, memory storage space, open communication ports, etc. Portions of the resources may be consumed by applications and/or services executed on the target node, such as an amount of memory space used for a particular service, consumption of a processing pipeline of the node, and the like. Thus, one or more portions of available (or free) resources of the node 916 not allocated to other services or being used by services and/or applications may be determined, such as available processing speed, available memory space, available communication ports, available bandwidth, and the like. As should be appreciated, the more services and/or applications stored on and executed by the node 906 may reduce the available resources of the node device, while fewer stored services may increase the available resources of the device.

The measurements of available resources from the node device 906 may be combined and converted into a density value via an algorithm, process, calculation, and the like. For example, it may be determined that node C 906 has 100 Gigabyte per second of processing speed available, 10 Gigabyte of memory space, and four communication ports available or otherwise not being consumed by services and/or applications of the device. Each of these measurements may be converted into a relative value and combined to provide an overall density score or value for the node 906. The conversion of available measurement values into a density value for the device may take many forms or algorithms. Regardless of the particular formula, algorithm, or process used to calculate the density value for the node 906, the density value indicates the available resources (compute, storage, and/or network) of the node device 906 that may be shared with other nodes of the network. In this manner, the density value calculated or otherwise determined for a node of the network may be used to manage sharing of resources among the devices of the network.

In one particular implementation, one or more nodes of the network may obtain its own measurements of the available resources of the corresponding device and provide the measurements to another node for processing. The receiving node may convert the received measurements of available resources into the density value for the respective nodes. In some instances, calculation of the density value for the nodes may be based on some or all received measurements. For example, the density value associated with a particular node may be generated based on the available resource measurements of other nodes of the network, such that nodes that have little to no available resources may be given a density value of zero while nodes with resources that are mostly available to share with other nodes may be given a density value of ten. The available resource measurements of each node may therefore be compared to this scale of zero to ten and a density value within the scale may be associated with the nodes accordingly. Thus, the density values for the nodes of the network may be a relative value based on the measured available resources for one or more nodes of the network that may establish a baseline for the range of density values. In general, the density value associated with a node of the network may be any value that may be utilized by the network to indicate available resources of the corresponding node.

In operation 1004, the density values for one or more node devices of the network that neighbor the target node device may be obtained or determined. In some instances, the neighboring nodes to the target nodes may be any node in direct logical communication (e.g., not via another node of the network) with the target node. In another instance, the neighboring nodes of a target node may include all nodes within a geographic region, such as all nodes within a 50 mile radius of the target node, regardless of the layer of the nodes or the number of nodes between the target node and the other nodes. In still another instance, the neighboring nodes may be nodes within the same fractal network or layer within the cloudless network, as explained in more detail above. In yet another instance, the neighboring nodes may include any portion or all of the nodes of the cloudless network. For example, in the instance in which a node of the network is dedicated to managing the sharing of resources of the all or some of the nodes of the network, available resource measurements for all or a large portion of the nodes of the network may be obtained by the dedicated node. In general, a neighboring node may include some density component or measurement, such as a time needed to transmit data between the target node and the neighbor node (or latency between the devices), compute capacity, storage capacity, etc. or other measurement based on the efficiency of network communications, to limit the number of nodes in the cloudless network that may be considered a neighboring node to another node of the network. Each node may generate, receive, and/or store a neighboring node density value for each neighboring node such that the target node may determine which other nodes in the network qualify as a neighbor and which do not for sharing resources. To determine the density value for a neighboring node, the target node may utilize the same algorithm as above to determine its own density value. In this manner, a density value for any number of neighboring nodes of the cloudless network may be obtained to aid in sharing of resources among the nodes of the network. The density values of the target node and/or the neighboring nodes may be stored for use in determining allocation of shared resources, as explained below.

In operation 1006, the target node may receive a request from a device, which may be a personal computing device, for a service. For example, node C 906 may receive a request from an application executed on mobile phone 918 to receive service A 910. The node 906 may determine, in operation 1008, if an instance of the requested service is available from the node. For example, the node 906 may access a storage medium to determine if the requested service is stored at the node or otherwise available for execution and use by the application of the personal computing device 918. If the requested service is available from the node 906, the node may provide the personal device access to the service in operation 1010. However, if the node 906 does not include the service, the node (or other computing device of the cloudless network) may begin a process of sharing resources among nodes of the network to obtain the service or otherwise make the service available to the requesting device.

In one example, the node 906 receiving the request for the service may determine the density value needed for the requested service in operation 1012. More particularly, each service available from the network may be associated with a particular density value needed to download and operate the service. For example, a security service as described above may be associated with a density value of three (3) based on the processing, storage, and communication requirements for executing the security service at the node 906. In another example, a multimedia service may be associated with a density value of eight (8) due to the large amount of memory storage, fast processing speed, and large communication bandwidth generally needed to provide a streaming multimedia presentation to a requesting device. In general, any service deployed onto the cloudless network may be associated with a density value that indicates or is otherwise associated with device resources needed to execute or otherwise provide the service to a requesting device. Returning to the above example, a density value for providing service A 910 to personal computing device 918 may be determined. In some instances, the density value associated with services of the network may be stored in a database of information of services available from the cloudless network.

Figure 9B:
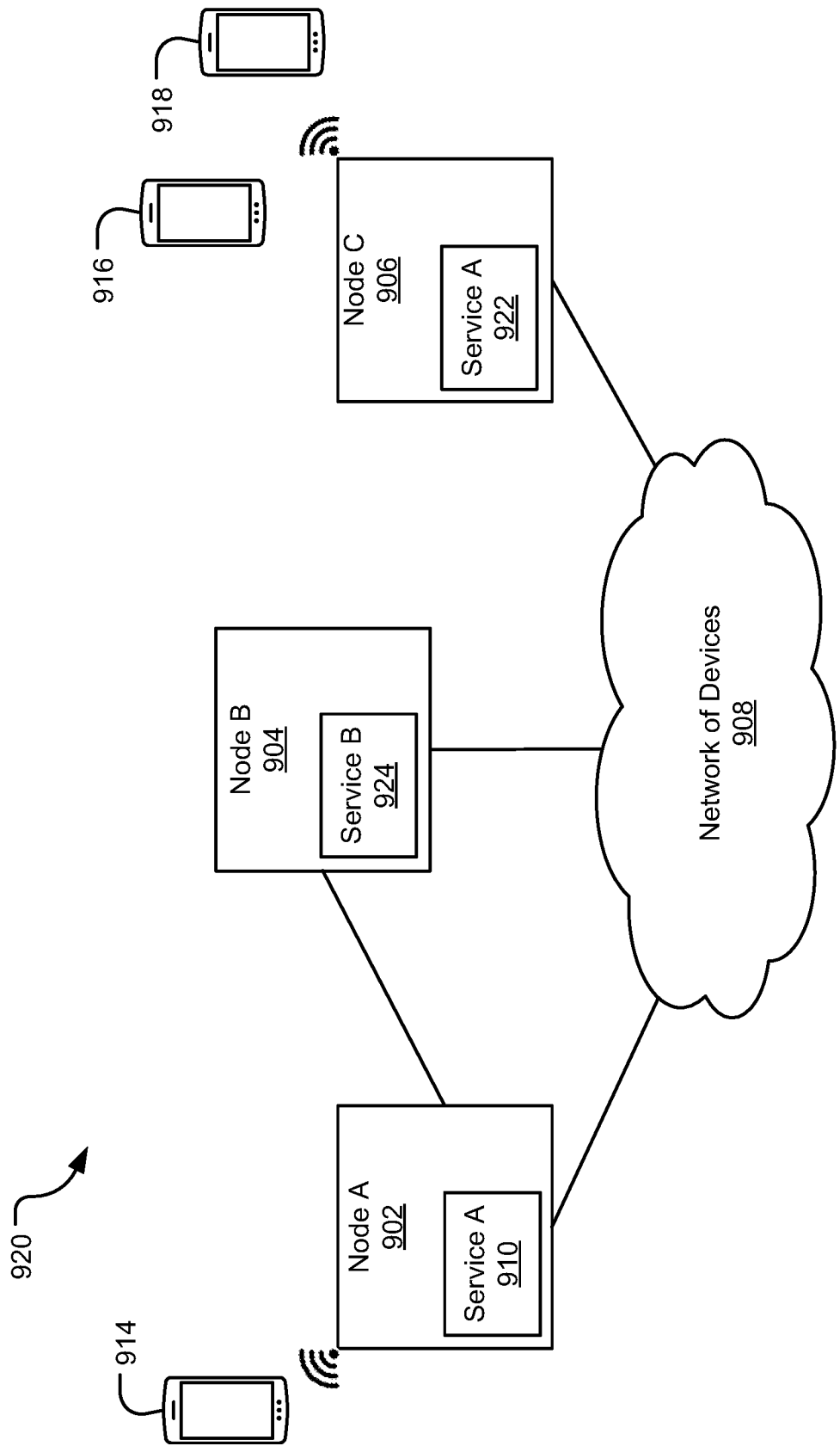

In operation 1014, the density value of the target node (such as node C 906) may be compared to the density value of the requested service to determine if the node device has enough resources available to download and operate the requested service. Continuing the above example, it may be determined that node C 906 has a density value of two because service B 912 may consume a large percentage of the resources of node C 906. Further, service A 910 may have a density value requirement of four, such that node C 906 does not have enough available resources to download and execute service A 910. If the density value of the target node device is less than the density value associated with the requested service, one or more resources may be shared among the nodes to free up resources in the targeted node. For example, in operation 1018, unused services on the target node may be migrated to one or more neighboring nodes (or compressed or deleted and afterwards re-downloaded) to free up capacity within the target node to obtain the requested device. Returning to FIG. 9A, it may be determined to migrate service B 912 from node C 906 to neighboring node B 904, as shown in the environment 920 of FIG. 9B. Following the migration of service B 924 to node B 904, an instance of service A 922 may be downloaded and executed at node C 906 for use by personal computing device 918, as explained in more detail below.

The decision to migrate the service 912 to node B 904 may be based on several factors. For example, the density value associated with node B 904 may be determined and compared to the density value associated with service B 912 to ensure that the node has enough capacity to accept migrated service B 912. In some instances, density values for all or some of the neighboring nodes of the target node may be analyzed to determine those nodes with a density value high enough for migration of service B 912. In another example, requesting device 916 may be in communication with more than one node of the network and a density value for each node may be used to determine which node of the multiple nodes in communication with the requesting device to which the service may be migrated. Another factor that may be considered is a distance, such as a geographical distance or a transmission distance, between the target node and the node to which a service may be migrated. In general, migration of a service to another node of the network may favor a shorter distance between the two nodes to reduce the transmission strain on the network of device 908. Thus, neighboring nodes to the transmitting node may be ranked based on distance from the transmitting node to further refine the selection of the node to which a service may be migrated. Other factors, such as type of connections between communicating nodes, number and type of personal computing devices in communication with the available nodes, types of services being migrated, and the like. In some instances, the neighboring nodes may be ranked based on these factors to determine a node to which a service may be migrated to free up resources on a target node and to increase the density value associated with the target node. In still additional instances, each node of a layer may receive the service (again based on the density of the nodes of the layer) upon a request being received at one node of the layer. In this implementation, the requesting device may be in communication with other nodes of the layer such that the requested device may be provided by another node of the layer that has available density to host the requested service.

Returning to the method 1000 of FIG. 10, the density value for the target node device may be regenerated following the migration of a service to a neighboring node in operation 1018. As services are migrated away from the target node to neighboring nodes, the available resources for the target node may be freed, increasing the density value calculation for that node. The regenerated density value for the target node may again be compared to the density value associated with the requested service in operation 1014 to determine if the density value of the node is greater than or equal to the required density. The process of migrating services from the target node to neighboring nodes may continue until the density value of the target node is greater than or equal to the required density value of the requested service. Upon increasing the density value of the node above the needed density value of the service, the requested service may be downloaded to the target node in operation 1016 and provided to the personal computing device in operation 1010. In one example, node C 906 may request and receive service A 922 from node A 902 of the network as node A has an instance of the service. However, node C 906 may receive an instance of service A 922 from any node of the cloudless network. In this manner, the density values of nodes and services may be utilized by the network to share resources among the nodes and ensure that requested services are provided to personal computing devices in communication with the cloudless network.

Although discussed above as migrating an entire service from one node to another, partial migration to one or more neighboring nodes may also be performed to free up resources at the target node. For example, personal computing device 916 may continue to request service B 912 from node C 906 at the same time that personal computing device 918 requests access to service A 922. In response, portions of service B 924 may be migrated to node B 924 while other portions of service B may remain on node C 906 to provide the service to personal device 916. In the particular example in which service B 912 provides multimedia presentations to personal device 916, the portion of the service that caches the multimedia presentation may be migrated to node B while the streaming component of the service remains on node C 906. While this may introduce some lag in providing the multimedia presentation to personal device 916, the migration of the caching portion of the service may free enough resources on node C 906 to allow for downloading of service A 922 to node C. Further, service B 912 may be divided up into portions and migrated to multiple nodes of the network, not necessarily a single node. Thus, a first portion of service B 912 may be migrated to node B 904 and a second portion may be migrated to node A 902, based on the above factors for migration of services between nodes. Further, service B 912 may remain available to personal computing devices 916, 918 via node C 906 after migration. In particular, the service may still be provided to the personal device 916, 918 from node B 904 (or other nodes of the network) with node C 96 operating as a switch or router for providing the service to the personal devices. Various factors may be considered in determining which node of the cloudless network may provide a service to a requesting device, such as transmission distance and density value. In another example, services may be purged from a layer or node based on an elapsed time that the service has been stored at the node or layer. In this manner, the density value of the services and/or the computing devices of the network may provide a generalized indication of available resources within the nodes of the network for sharing and providing resources to connected personal computing devices.

The density values for the nodes of the cloudless network may also be used to expand the density of the network through addition of more nodes to the network. For example, the process described above for associating a layer value or identifier to a new node of the network may utilize a density value of the nodes of the network to determine which layer a new node is assigned. The density value of any number of nodes in a target layer or any other layer may be taken into account when determining to which layer a node may be assigned. In another example, a service may be executed on the network to monitor the density values of clusters of related nodes, such as nodes in a defined group, nodes in a particular geographic region, nodes sharing particular services, and the like. The monitored density values may be compared to a threshold density value for each node or for a group of nodes of the network. If the density values of the monitored nodes equals, exceeds, or otherwise indicates a lack of available resources in the group of nodes, additional nodes may be added to the group of nodes of the network. In one instance, one or more inactive nodes of the cloudless network may be activated and/or registered with the network to add additional resources into the network to which services and/or applications may be migrated, as discussed above. For example, a service executed on the cloudless network may communicate with one or more inactive nodes and begin the process of registering or otherwise activating the inactive nodes with the network. Upon activation, one or more services may be migrated to the newly activated nodes to reduce the density value associated with one or more nodes of the network.

Figure 11:
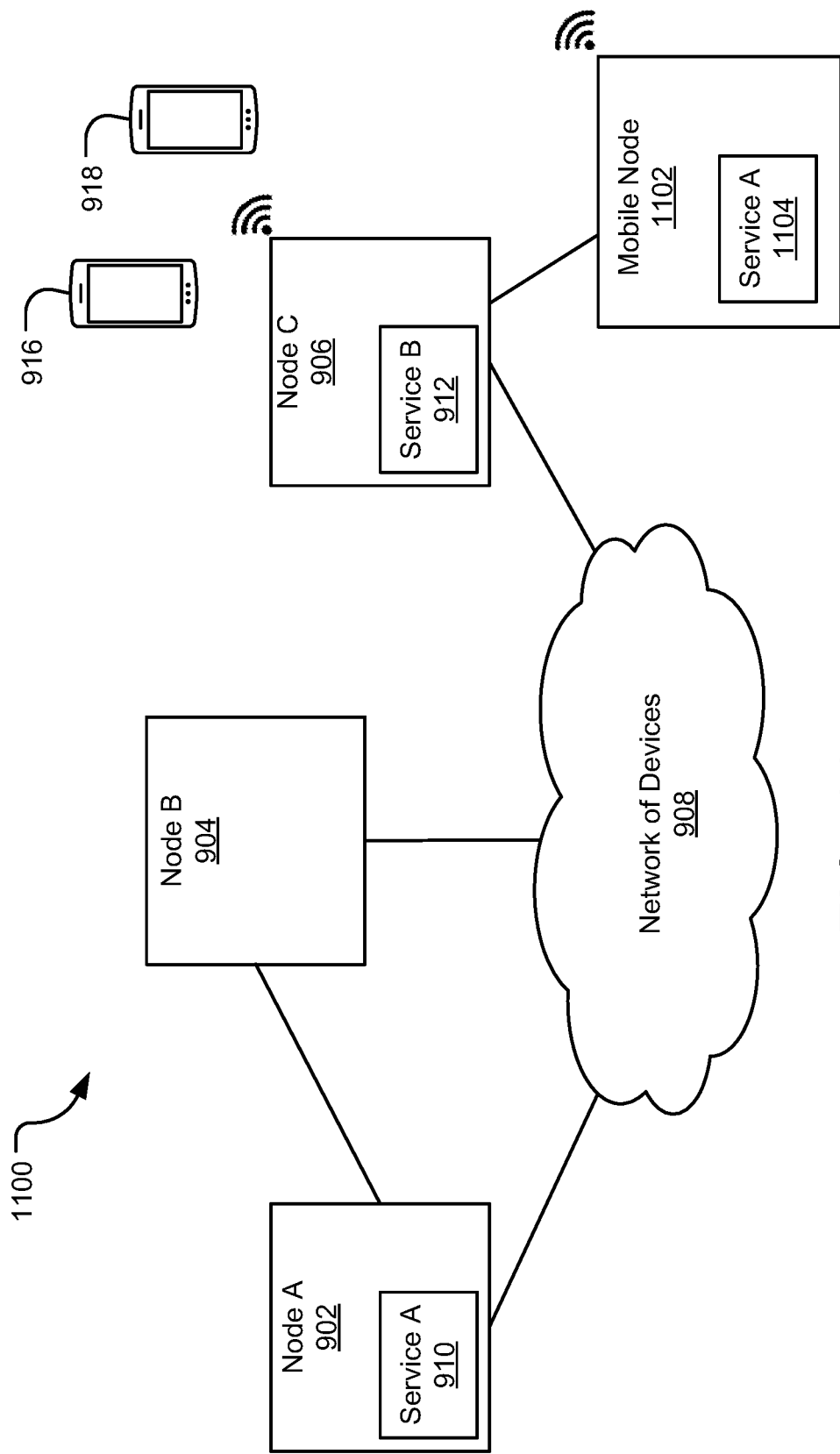
FIG. 11 is a schematic diagram illustrating deployment of a mobile node onto the cloudless infrastructure in accordance with one embodiment.

In another instance, one or more mobile nodes may be deployed to a geographic area or near a group of nodes of the network based on the monitored density value associated with nodes of the network. FIG. 11 is a schematic diagram illustrating a network environment 1100 including deployment of a mobile node 1102 onto the cloudless network in accordance with one embodiment. Many of the components of the network environment 1100 are similar to that described above with reference to FIG. 9A, including network of devices 908 that may include node A 902, node B 904, and node C 906. Similar to the description above, node C 906 may receive a request from personal computing device 918 for access to service A of the network. Through the method 1000 of FIG. 10, it may be determined that the density value of node C 906 indicates that the resources of node C are insufficient to download and install service A. In response, service B 912 may be migrated from node C 906 to another node of the cloudless network, such as node B 904. Alternatively or in addition to migration of service B 912, a mobile node 1102 may be deployed into a geographic area near node C 906 in response to the determination that the density values of nodes near node C exceed a threshold value. In other words, the network may determine, utilizing the density values of nodes, areas of the network in which available resources may not support additional requests for applications or otherwise indicates a lack of needed resources. The mobile node 1102 may be deployed into the area near node C 906 to provide additional resources to the network in the vicinity of node C. The mobile node 1102 may be deployed without services installed on the device or may be pre-installed with services known to have been requested in the area of node C 906, such as service A 1104. Regardless of the installed services, mobile node 1102 may be deployed to add resources into a portion of the network and lower the overall density value for the nodes of the area.

In many instances, the mobile node will be provided by a mobile computing device, such as a smart phone or the like, that includes a level of computing power, storage and communication capabilities. In other instances, the mobile node will be provided by a server or other computing device. In yet other e instances, the mobile node 1102 may be a computing device integrated with a mobile platform. For example, mobile node 1102 may include a node device along with a vehicle, a flying drone, a balloon-type conveyance, and the like. The mobile node 1102 may, in some instances, be solar-powered to provide power to the node device and/or the mobile platform. The mobile node 1102 may be manned or unmanned and a general geographic destination location for the mobile node 1102 may be generated and provided to the mobile node. An operator of a manned mobile nodes 1102 may receive the destination location and control the mobile node to the destination. Unmanned mobile nodes 1102 may receive the destination and autonomously navigate to the received destination. Mobile nodes 1102 arriving in an area may register/authenticate in a similar manner as described above and, once registered with the network, may operate as a node of the network. In one implementation, personal computing device 918 may be instructed to communicate with mobile node 1102 to receive service A 1104 if service B 912 cannot be migrated from node C 906. The deployment of mobile nodes 902 into the network in response to density values of the nodes may improve the reliability of the cloudless network, response time for providing services, and the geographic footprint of the network.

Figure 12:
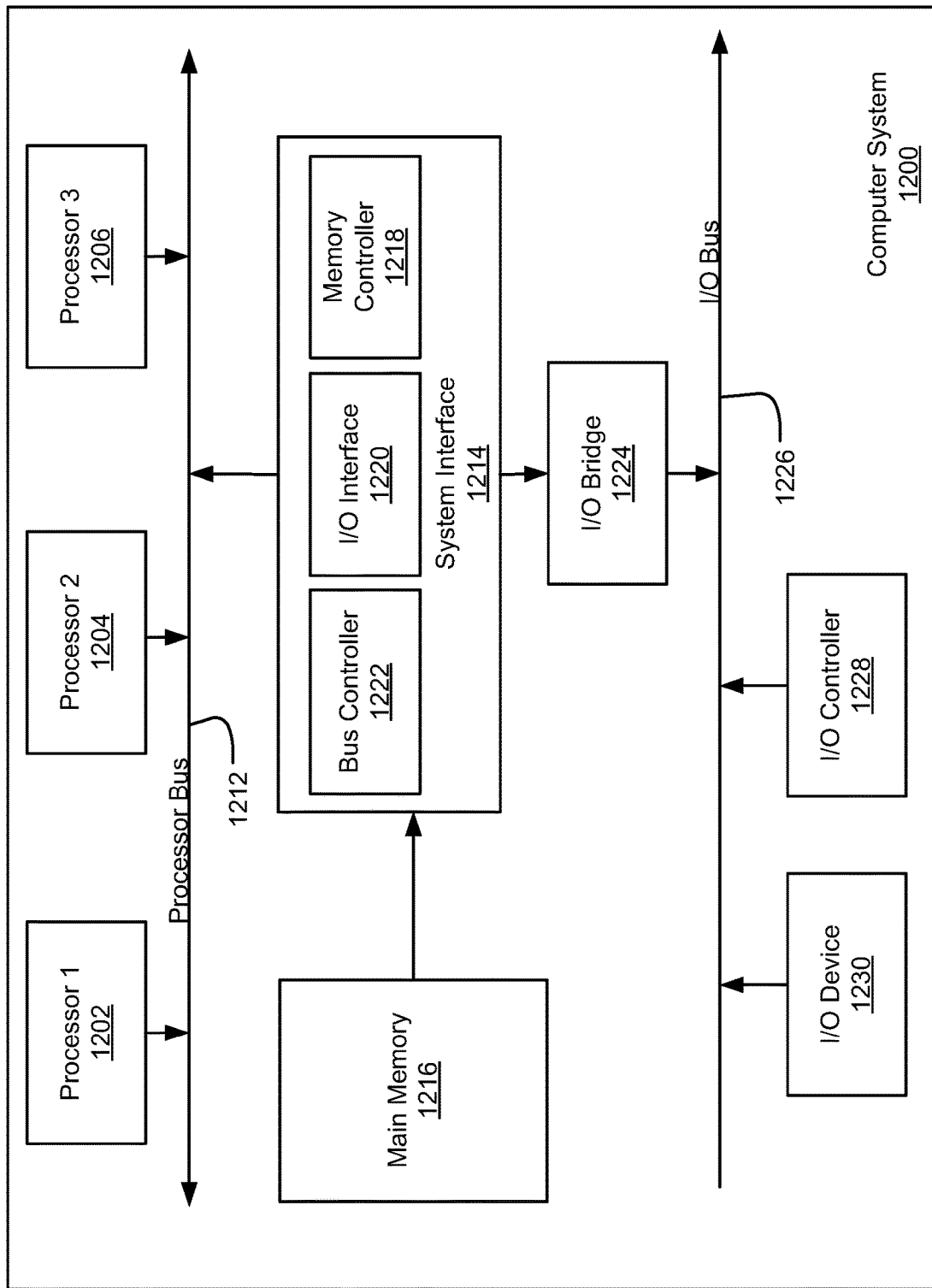
FIG. 12 is a diagram illustrating an example of a computing system which may be used in implementing embodiments of the present disclosure.

FIG. 12 is a block diagram illustrating an example of a computing device or computer system 1200 which may be used in implementing the embodiments of the components of the network disclosed above. For example, the computing system 1200 of FIG. 12 may be the node device 200 of personal computing device 106 discussed above. The computer system (system) includes one or more processors 1202-1206. Processors 1202-1206 may include one or more internal levels of cache (not shown) and a bus controller or bus interface unit to direct interaction with the processor bus 1212. Processor bus 1212, also known as the host bus or the front side bus, may be used to couple the processors 1202-1206 with the system interface 1214. System interface 1214 may be connected to the processor bus 1212 to interface other components of the system 1200 with the processor bus 1212. For example, system interface 1214 may include a memory controller 1214 for interfacing a main memory 1216 with the processor bus 1212. The main memory 1216 typically includes one or more memory cards and a control circuit (not shown). System interface 1214 may also include an input/output (I/O) interface 1220 to interface one or more I/O bridges or I/O devices with the processor bus 1212. One or more I/O controllers and/or I/O devices may be connected with the I/O bus 1226, such as I/O controller 1228 and I/O device 1230, as illustrated.

I/O device 1230 may also include an input device (not shown), such as an alphanumeric input device, including alphanumeric and other keys for communicating information and/or command selections to the processors 1202-1206. Another type of user input device includes cursor control, such as a mouse, a trackball, or cursor direction keys for communicating direction information and command selections to the processors 1202-1206 and for controlling cursor movement on the display device.

System 1200 may include a dynamic storage device, referred to as main memory 1216, or a random access memory (RAM) or other computer-readable devices coupled to the processor bus 1212 for storing information and instructions to be executed by the processors 1202-1206. Main memory 1216 also may be used for storing temporary variables or other intermediate information during execution of instructions by the processors 1202-1206. System 1200 may include a read only memory (ROM) and/or other static storage device coupled to the processor bus 1212 for storing static information and instructions for the processors 1202-1206. The system set forth in FIG. 12 is but one possible example of a computer system that may employ or be configured in accordance with aspects of the present disclosure.

According to one embodiment, the above techniques may be performed by computer system 1200 in response to processor 1204 executing one or more sequences of one or more instructions contained in main memory 1216. These instructions may be read into main memory 1216 from another machine-readable medium, such as a storage device. Execution of the sequences of instructions contained in main memory 1216 may cause processors 1202-1206 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Various modifications and additions can be made to the exemplary embodiments discussed without departing from the scope of the description. For example, while the embodiments described above refer to particular features, the scope of this invention also includes embodiments having different combinations of features and embodiments that do not include all of the described features. Accordingly, the scope of the present description is intended to embrace all such alternatives, modifications, and variations together with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

We claim:

1. A method for securing a network communication, the method comprising:
    identifying, based on a request for an encryption key received from a first computing device of an interconnected network of computing devices, a random selection of multiple nodes of the interconnected network of computing devices from which random entropic digital data is obtained, the multiple nodes located in geographically diverse environments;
    randomly selecting, from the multiple nodes of the interconnected network of computing devices, multiple types of the random entropic digital data, the random entropic digital data acquired by a plurality of sensors each associated with at least one of the multiple nodes of the interconnected network;
    translating, by a security service of the interconnected network of computing devices, the entropic digital data into a sequence of prime number values;
    converting, utilizing a repeatable hashing technique executed by the security service, the sequence of prime number values into an encryption key value;
    storing at least a portion of the encryption key value at the first computing device of the interconnected network of computing devices; and
    encrypting, by a second computing device of the interconnected network of devices and using the encryption key value, a communication associated with the second computing device, the first computing device decrypting the encrypted communication utilizing the portion of the encryption key value.

2. The method of claim 1 wherein the random entropic digital data comprises a measurement of an environmental condition of a corresponding node of the interconnected network of computing devices, the plurality of sensors comprising at least one of a temperature sensor, a humidity sensor, an atmospheric sensor, a light sensor, or a sound sensor in communication with a corresponding node of the interconnected network of computing devices.

3. The method of claim 2 wherein the measurement of the environmental condition comprises at least one of a temperature, a humidity, an atmospheric pressure, a light, or a sound measurement from an environment near the corresponding node.

4. The method of claim 1 wherein the random entropic digital data comprises a bio-measurement associated with a user of a corresponding node of the interconnected network of computing devices, the bio-measurement comprising at least one of a body temperature, a heart rate, or a count of accumulated steps taken by the user in a time period.

5. The method of claim 4 wherein the plurality of sensors comprises a wearable sensor device to obtain the bio-measurement associated with the user.

6. The method of claim 1 wherein the encryption key value comprises a public encryption key and a private encryption key, the portion of the encryption key value stored at the first computing device comprising the public encryption key and the private encryption key stored at the second computing device, the first computing device decrypting the communication using the public encryption key.

7. A system for securely operating an interconnected network of computing devices, the system comprising:
    a plurality of node devices interconnected in a cloudless infrastructure, each of the plurality of node devices located in geographically diverse environments from the other of the plurality of node devices and each comprising:
        one or more sensors to obtain entropic digital data associated with a corresponding node device of the plurality of node devices;
        a processor; and
        a memory comprising instructions that, when executed, cause the processor to:
            identify, based on a request for an encryption key received from a first computing device associated with the cloudless infrastructure, a type of the entropic digital data;
            obtain, from the one or more sensors, the type of entropic digital data; and
            transmit the type of entropic digital data to the first computing device, wherein the first computing device:
    randomly selects each of the plurality of node devices of the cloudless infrastructure and the type of entropic digital data;
    receives, from each of the randomly selected plurality of node devices of the cloudless infrastructure, random entropic digital data, a portion of which corresponds to the type of entropic digital data;
    converts, utilizing a repeatable hashing technique executed by the first computing device, the random entropic digital data into an encryption key value; and
    encrypts a communication using the encryption key value.

8. The system of claim 7 wherein the one or more sensors comprise a temperature sensor, a humidity sensor, an atmospheric sensor, a light sensor, or a sound sensor, the type of entropic digital data comprising a measurement at least one of a temperature, a humidity, an atmospheric pressure, a light, or a sound measurement.

9. The system of claim 7 wherein a one of the plurality of node devices receives, from a wearable sensor device in communication with the one of the plurality of node devices, a bio-measurement, the type of entropic digital data comprising the bio-measurement.

10. The system of claim 7 wherein the plurality of node devices is a portion of the cloudless infrastructure of computing devices and the first computing device selects the plurality of node devices from the cloudless infrastructure of computing devices.

11. A method for securing a network communication, the method comprising:
    randomly selecting multiple nodes from an interconnected network of computing devices;
    obtaining, from the randomly selected multiple nodes, random entropic digital data acquired by a plurality of sensors each associated with at least one of the multiple nodes of the interconnected network, the random entropic digital data from a randomly selected type of entropic digital data;
    translating, by a security service of the interconnected network of computing devices, the entropic digital data into a sequence of prime number values;
    converting, utilizing a repeatable hashing technique executed by the security service, the sequence of prime number values into an encryption key value;
    storing at least a portion of the encryption key value at a first computing device of the interconnected network of computing devices; and
    encrypting, by a second computing device of the interconnected network of devices and using the encryption key value, a communication associated with the second computing device, the first computing device decrypting the encrypted communication utilizing the portion of the encryption key value.

12. The method of claim 11 wherein the random entropic digital data comprises a measurement of an environmental condition of a corresponding node of the interconnected network of computing devices, the measurement of the environmental condition comprising at least one of a temperature, a humidity, an atmospheric pressure, a light, or a sound measurement from an environment near the corresponding node.

13. The method of claim 12 wherein the plurality of sensors comprises a temperature sensor, a humidity sensor, an atmospheric sensor, a light sensor, or a sound sensor in communication with the corresponding node of the interconnected network of computing devices.

14. The method of claim 11 wherein the random entropic digital data comprises a bio-measurement associated with a user of a corresponding node of the interconnected network of computing devices, the bio-measurement comprising at least one of a body temperature, a heart rate, or a count of accumulated steps taken by the user in a time period.

15. The method of claim 14 wherein the plurality of sensors comprises a wearable sensor device to obtain the bio-measurement associated with the user.

16. The method of claim 11, further comprising:
    accessing an entropic data database in communication with the interconnected network of computing devices to obtain the random entropic digital data.

17. The method of claim 11 wherein the encryption key value comprises a public encryption key and a private encryption key, the portion of the encryption key value stored at the first computing device comprising the public encryption key and the private encryption key stored at the second computing device.

18. The method of claim 11, further comprising:
    transmitting, based on a request for the encryption key value, the security service to the second computing device for execution by the second computing device.

19. The method of claim 11 wherein the security service is executed by a node of the interconnected network of computing devices, the method further comprising transmitting, from the node and to the second computing device, the encryption key value.

* * * * *